(12) United States Patent
Katayama et al.

(10) Patent No.: US 7,155,015 B2
(45) Date of Patent: Dec. 26, 2006

(54) OPTICAL DISK APPARATUS AND DATA RANDOMIZING METHOD USING FOR OPTICAL DISK APPARATUS

(75) Inventors: Yukari Katayama, Chigasaki (JP); Takeshi Maeda, Kokubunji (JP); Shigeki Taira, Yokohama (JP); Harukazu Miyamoto, Kodaira (JP); Osamu Kawamae, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 835 days.

(21) Appl. No.: 09/811,405

(22) Filed: Mar. 20, 2001

(65) Prior Publication Data
US 2002/0037080 A1    Mar. 28, 2002

(30) Foreign Application Priority Data
Aug. 8, 2000 (JP) ............................. 2000-245521
Nov. 21, 2000 (JP) ............................. 2000-359479

(51) Int. Cl.
*H04L 9/00* (2006.01)
(52) U.S. Cl. .................. 380/267; 380/22; 380/210; 380/268; 714/728; 714/739
(58) Field of Classification Search ................ 380/267, 380/22, 40–45, 210, 268; 713/193; 369/59.25, 369/59.23, 59.26; 714/728, 739
See application file for complete search history.

(56) References Cited

U.S. PATENT DOCUMENTS 5,867,475 A * 2/1999 Moriya et al. ............ 369/275.3
5,917,914 A * 6/1999 Shaw et al. .................... 380/42
5,987,630 A * 11/1999 Yamawaki .................... 714/701
6,052,817 A * 4/2000 Whaley ........................ 714/769
6,253,349 B1 * 6/2001 Maeda et al. ............... 714/799
6,289,102 B1 * 9/2001 Ueda et al. .................. 380/201
2001/0046295 A1 * 11/2001 Sako et al. .................. 380/201
2004/0098661 A1 * 5/2004 Chuang et al. .............. 714/784

OTHER PUBLICATIONS

Kees A. Schouhamer Immink, Codes for Mass Data Storage Systems, 1999, Shannon Foundation Publishers, The Netheralands, pp. 261-271.*
Hoshizawa et al. Random Seed Scrambling Method For High Density Phase Change Optical Discs, 2002, IEEE.*
Standard—ECMA—272.
"Codes for Mass Data Storage Systems" (K. A. S. Immink, Shannon Foundation Publisher, 1999).
"Polynominals for Guided Scrambilng Line Codes" (IEEE Journal on Selected are as in COMMUNICATIONS, vol. 13, No. 3, Apr. 1995).
JAPANESE Laid—open No. Hei 6 (94)—274885.

* cited by examiner

*Primary Examiner*—Kim Vu
*Assistant Examiner*—Beemnet W Dada
(74) *Attorney, Agent, or Firm*—Antonelli, Terry, Stout and Kraus, LLP.

(57) ABSTRACT

In the optical disk apparatus, an arbitrary seed data for randomizing is added to an original data to be recorded on a disk. One-bit randomizing data is determined by operation using one-bit original data or seed data, and plural-bit past randomized data. At the time of descrambling, descrambling is performed without seed data.

13 Claims, 25 Drawing Sheets

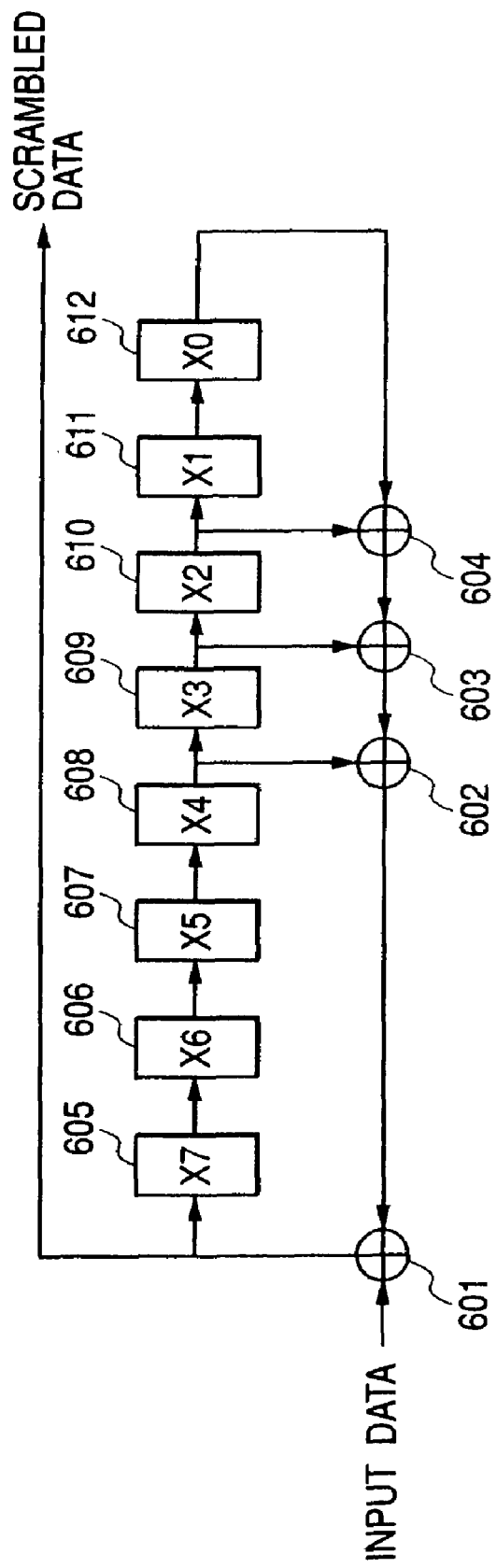

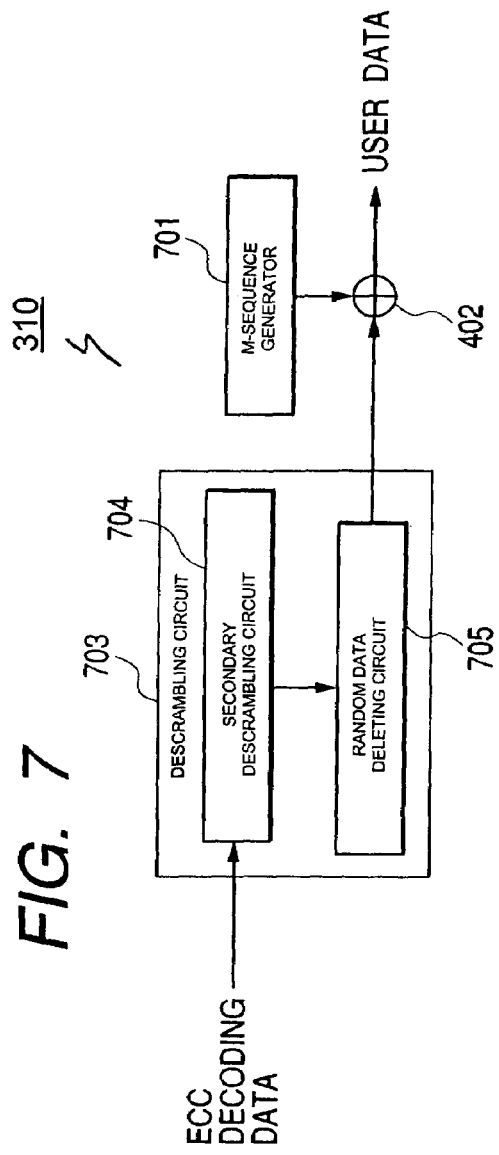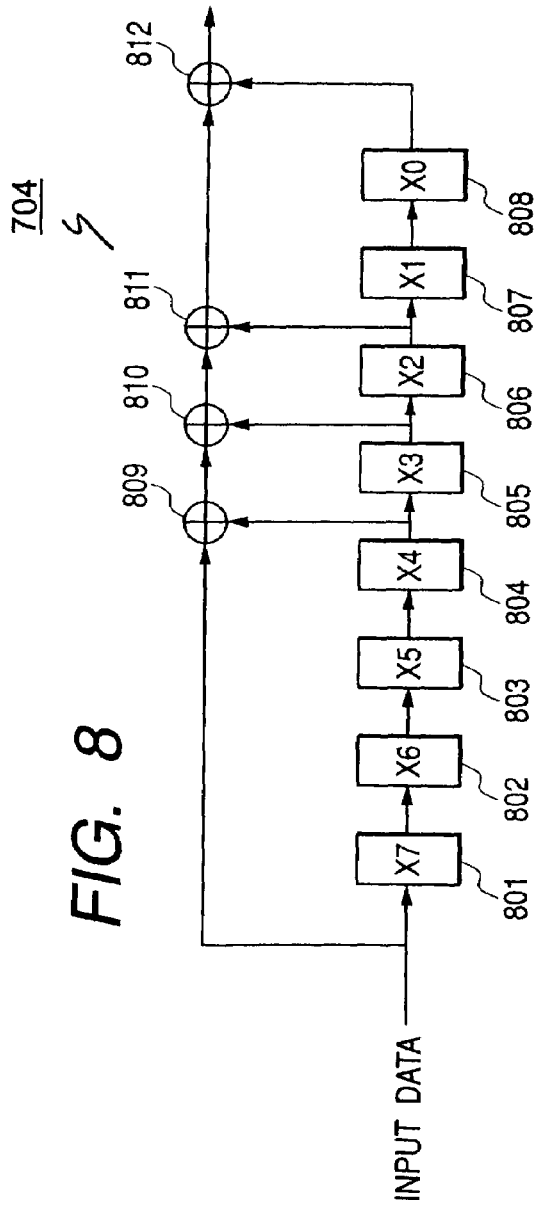

| GROUP | SEED | GROUP | SEED |
|---|---|---|---|
| SEED Gr0 | 0~8 | SEED Gr1 | 9~17 |
| SEED Gr2 | 18~26 | SEED Gr3 | 27~35 |
| SEED Gr4 | 36~44 | SEED Gr5 | 45~53 |
| SEED Gr6 | 54~62 | SEED Gr7 | 63~71 |
| SEED Gr8 | 72~80 | SEED Gr9 | 81~89 |
| SEED Gr10 | 90~98 | SEED Gr11 | 99~107 |
| SEED Gr12 | 108~116 | SEED Gr13 | 117~125 |
| SEED Gr14 | 126~134 | SEED Gr15 | 135~143 |
| SEED Gr16 | 144~152 | SEED Gr17 | 153~161 |
| SEED Gr18 | 162~170 | SEED Gr19 | 180~188 |
| SEED Gr20 | 189~197 | SEED Gr21 | 198~206 |
| SEED Gr22 | 207~215 | SEED Gr23 | 216~224 |
| SEED Gr24 | 225~233 | SEED Gr25 | 234~242 |

OPTICAL DISK APPARATUS AND DATA RANDOMIZING METHOD USING FOR OPTICAL DISK APPARATUS

FIELD OF THE INVENTION

This invention relates to an optical disk apparatus such as DVD or the like and particularly to the data scramble method in recording data on a medium in the optical disk apparatus.

BACKGROUND OF THE INVENTION

Generally, in a rewritable optical disk such as DVD-RAM or the like, a recording mark is generated on a track of a disk by power of light to thereby write data. Further, data is read out by utilizing a difference in reflectance of light between the recording mark and a portion outside the mark. In the DVD-RAM, a groove is formed on a disk, and data is written on both the groove and a non-groove portion (land) to attain high density recording.

The control for accurately positioning a head on the track is called tracking. In the DVD-RAM, micro-vibrations of a land and a groove, which are called wobble, are caused, and tracking is performed by utilizing them. When the same data is written in the adjacent tracks, however, the problem encountered is that a tracking signal becomes feeble and tracking tends to slip. In the DVD for processing an image and sound data, frequently the same data such as a silent portions is written in a large amount. To solve this problem, various measures have been taken so that even if a large amount of the same data is written, the written data in the adjacent tracks do not become the same. According to a method disclosed in Japanese Patent Laid-Open No. Hei 6(94)-274885, for example, the beginning of a sector begins at a mark called pit or a non-mark portion called land alternately track by track. Further, according to a method described in ECMA-272 "120 mm Rewritable Disk (DVD-RAM)", in the DVD-RAM, ID information of each frame is taken as a seed to generate a M-sequence (random sequence), and the M-sequence is added to the user data to be written in a disk. Such data randomizing is generally called scramble.

On the other hand, in field of optical communication, a method called guided scramble has been adopted for the purpose of creating a run-length limited code having a flat frequency characteristic suitable for optical communication. According to this method, data having an enough large space is added to the beginning of the data to create a run-length limited code, thereby producing many kinds of data, and among the data obtained by randomizing the thus produced data, one data near a required characteristic is selected. This method is described in detail in "Codes for Mass Data Storage Systems" K. A. S. Immink, Shannon Foundation Publishers, 1999. Further, as a paper, this method is described in "Polynomials for Guided Scrambling Line Code", IEEE JOURNAL ON SELECTED AREAS IN COMMUNICATIONS, Vol. 13, NO. 3, APRIL. 1995.

SUMMARY OF THE INVENTION

The rewritable optical disk, however, has the problem that when the same data is written many times in the physically same place (sector) on an optical disk medium, the medium changes in quality, and when new data is written, the remained former data tends to be viewed as a noise.

According to the invention, to solve the above problem, data is scrambled by making use of an arbitrary seed. Preferably, arbitrary seed data for performing randomizing is added to the original data to be recorded on a disk. One bit randomizing data is determined by operation using one bit original data or seed data and multiple-bits past randomized data.

Further, to solve the above problem, the invention adopts a descrambling method not requiring seed data. To be concrete, at the time of reproducing data, used is a data randomizing release method which is characterized in that one bit de-randomizing data is determined by operation using multiple-bits randomized data.

BRIEF DESCRIPTION OF THE DRAWINGS

FIG. 6 is a detailed circuit diagram of a secondary scrambling circuit in the first embodiment of the invention;

FIG. 7 is a detailed block diagram of the descrambling circuit in the first embodiment of the invention;

FIG. 8 is a detailed circuit diagram of a secondary descrambling circuit in the first embodiment of the invention;

DESCRIPTION OF THE PREFERRED EMBODIMENTS

Figure 3:
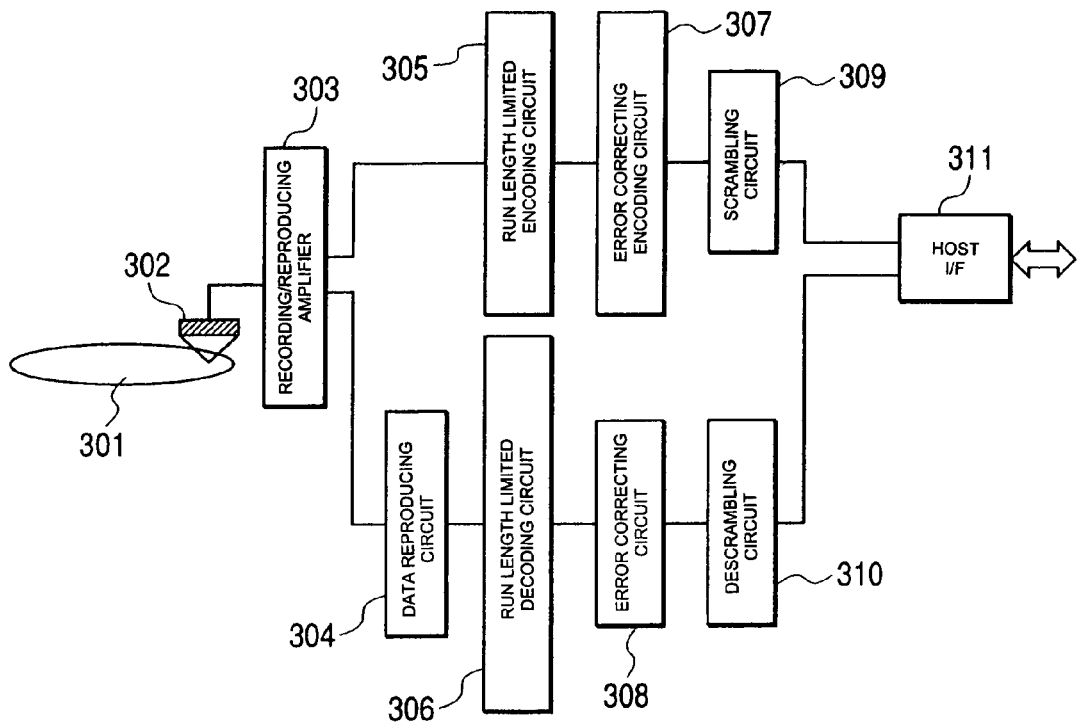
FIG. 3 is a schematic block diagram of an optical disk apparatus according to a first embodiment of the invention.

FIG. 3 is a block diagram showing the configuration of an optical disk apparatus according to the first embodiment of the invention. The embodiments described in the following will not set limits to the invention, but the optical disk apparatus may be recording and reproducing apparatus such as a deferred image and voice recording and reproducing apparatus connected to a television set, a portable video camera or a portable voice reproducing apparatus in addition to a storage device used in the computer system as in the present embodiment.

In FIG. 3, a host interface (host I/F) 311 controls the data transfer between the optical disk apparatus and a host computer such as a personal computer not shown. A scrambling circuit 309 randomizes data. An error correcting encoding circuit 307 adds an error correcting code to the randomized data. A run length limited encoding circuit 305 modulates the data to which an error correcting code is added according a predetermined rule to be converted to data which can be recorded on an optical disk 301 as a recording medium. A recording and reproducing amplifier 303 receives coded data from the run length limited encoding circuit 305, and converts the same to a voltage waveform suitable for a recording and reproducing head 302. The recording and reproducing head 302 converts the received voltage waveform to optical laser, and writes a mark on the optical disk 301 by optical power.

At the time of reading the data, the recording and reproducing head 302 applies a laser light to the optical disk 301 to read the data by reflected light by utilizing a difference in reflection intensity of light between a mark and a non-mark part, and converts the read information to an electric signal. The converted electric signal is moderately amplified by the recording and reproducing amplifier 303, and then output to a data reproducing circuit 304. The data reproducing circuit 304 converts a read analog signal to a digital information row of 0 and 1.

The data row is demodulated in reverse to the run length limited encoding circuit 305 by a run length limited code decoding circuit 306. In an error correcting circuit 308, on the basis of the error correcting code added by the error correcting encoding circuit 307, the error position and the error value are obtained to correct the error. The data subjected to error correction is restored to the original data by a descrambling circuit 310. In the optical disk apparatus, the data is recorded and reproduced according to the above procedure.

Figure 4:
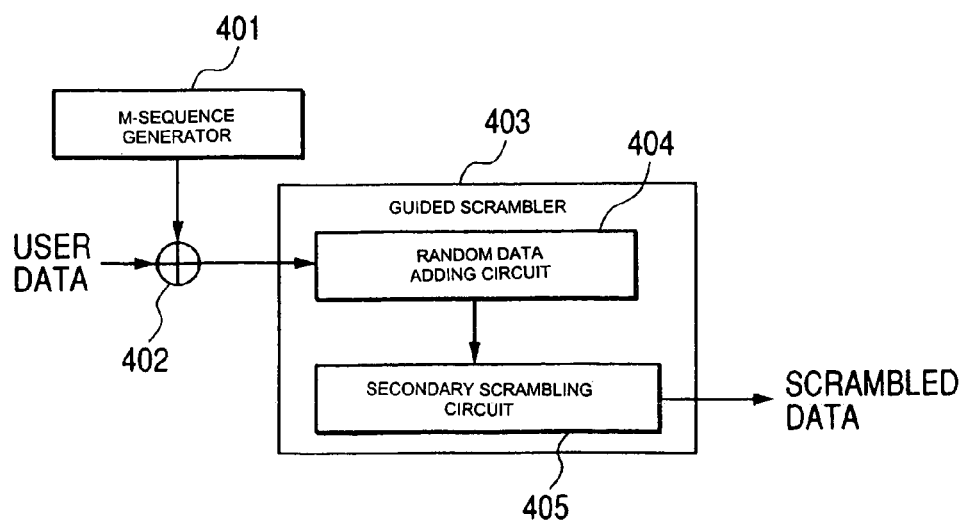
FIG. 4 is a detailed block diagram of a scrambling circuit in the first embodiment of the invention.

FIG. 4 is a block diagram of the scrambling circuit 309.

User data sent from the host I/F 311, to which a fixed random sequence made by a M-sequence generator 401 has been added in an EOR circuit 402, is input to a guided scrambler 403.

Figure 5:
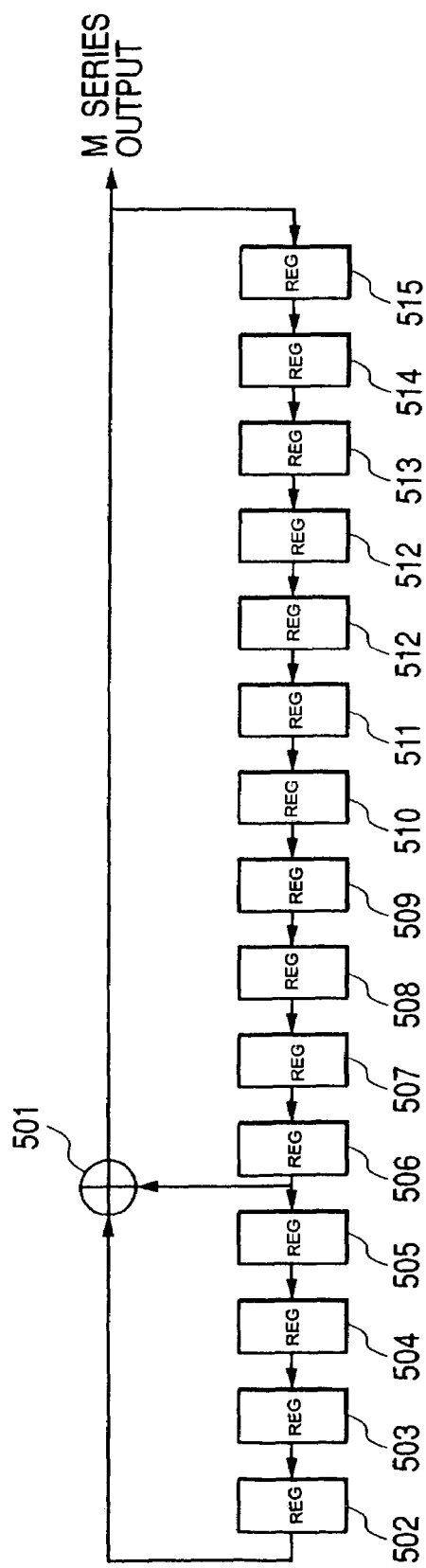
FIG. 5 is a detailed circuit diagram of a M-sequence generator in the first embodiment of the invention.

FIG. 5 is a circuit diagram of the M-sequence generator 401. The reference numerals 502 to 515 are registers for storing data in units of one bit, which conduct shift operation in synchronization with the user data. The reference numeral 501 is an exclusive-OR circuit. In the initial state, only the register 515 is set to one, and the registers 502 to 514 are set to zero. In the present embodiment, supposed is an M-sequence generator using a polynominal of the fifteenth degree shown in the expression 1. In the following, polynominals used in the present embodiment are all polynominals on GF (2), and "+" indicates an exclusive-OR.

$$x^{15}+x^4+1 \tag{1}$$

A sequence generated by the M-sequence generator 401 is a pseudo-random sequence with a period of $2^{15}-1=32767$. In the present embodiment, the M-sequence generator 401 is not always needed, but only the guided scrambler 403 will be sufficient. To improve random performance, however, in the present embodiment, the M-sequence 401 is jointly used.

Figure 9:
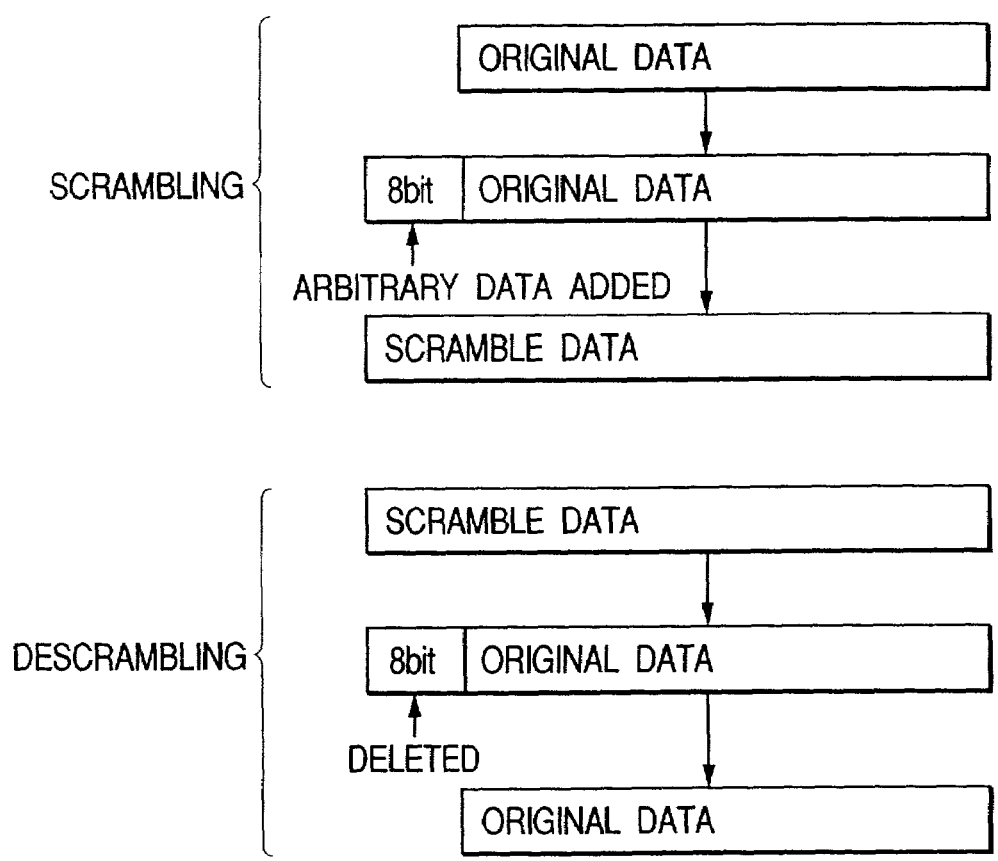
FIG. 9 is a conceptual drawing of the first embodiment.

The guided scrambler 403, as shown in FIG. 9, adds 8-bit data to the beginning of the data. The added data is an arbitrary 8-bit data. For example, it may be the data generated on the basis of time when data is written or the value incremented one by one at every writing by an 8-bit increment counter. This 8-bit added to the beginning of the data becomes an initial value (seed) for randomizing. As the 8-bit data is added in the embodiment, randomizing can be performed in $2^8=256$ ways, from "00000000" to "11111111". That is, in the case of recording the same user data in the physically same place, the probability that the actually written data becomes the same is 1/256. The same may be said of the case of writing the same user data in the adjacent track.

Randomizing is thus performed to avoid deterioration of the optical disk 301, so that a tracking error can be reduced. The added data should not be always 8-bit, but further more or less may be good. The added-bit (initial value) should not be attached to the beginning of the user data, but be put in an arbitrary portion of the user data. The user data on and after the portion where the added-bit is added is generated as a sequence varied with every initial value. In the embodiment, added data is placed at the beginning which enables randomizing most efficiently. However, in the case where there is information such as ID information to be read before descrambling, it is better to insert the added-bit after the ID information or the like.

FIG. 6 is a circuit diagram of a secondary scrambling circuit 405. The reference numerals 601 to 604 are exclusive-OR circuits. The reference numerals 605 to 612 are registers for storing data in units of one bit. The registers 605 to 612 are set to zero in the initial state. The secondary scrambling circuit 405 conducts shift operation in synchronization with the input data.

By this circuit, scrambling is performed according to the expression 2.

$$c_i = b_i + c_{i-4} + c_{i-5} + c_{i-6} + c_{i-8} \tag{2}$$

wherein bi is i-th bit data before entering the secondary scrambling circuit 405, and ci−j is data j bits ahead of the i-th bit data output from the secondary scrambling circuit. It is known from the expression that ci is created from one bit data before scrambling and multiple-bit past data after scrambling.

The scrambled data is sent to the error correcting encoding circuit 307.

FIG. 7 is a block diagram of the descrambling circuit 310. FIG. 8 is a circuit diagram of the secondary descrambling circuit 704 shown in FIG. 7. The reference numerals 801 to 808 are registers for storing data in units of one bit. The reference numerals 809 to 812 are exclusive-OR circuits. The secondary descrambling circuit 704 also conducts shift operation in synchronization with input data similarly to the secondary scrambling circuit 405.

The operation of the descrambling circuit 310 will now be described.

The data subjected to error correction by the error correcting circuit 308 is input to the secondary descrambling circuit 704 of the guided descrambling circuit 703. By the secondary descrambling circuit 704, descrambling shown in the expression 3 is performed.

$$b_i = c_i + c_{i-4} + c_{i-5} + c_{i-6} + c_{i-8} \tag{3}$$

wherein bi is i-th bit user data descrambled, and ci-j is data j-bit ahead of i-th bit data input from the error correcting circuit 308. In the case where the descrambling circuit performs descrambling, even if the initial value of scrambling is not known, descrambling is enabled. In the case where an error which can not be corrected by the error correcting circuit 308 occurs, in the descrambled user data, the error is extended for 8 bits. However, error propagation is caused only for 8 bits, and more propagation will not be caused.

In the descrambled user data, as shown in FIG. 9, an 8-bit added by a random data adding circuit 404 is deleted by a-random data deleting circuit 705.

An M-sequence generator 701 is the same as the M-sequence generator 401, and shown in FIG. 5. The user data is descrambled by adding the same in the exclusive-OR circuit 402.

Though the scrambling circuit is formed by using shift registers for bit shifting in the embodiment, it may be effected by using an equivalent circuit operated in byte units.

In the embodiment, an 8-bit source polynominal $$x^8 + x^4 + x^3 + x^2 + 1 \tag{4}$$

is used to perform guided scrambling, but any polynominal will be used here if it is a source polynominal. For the general form of a polynominal $$\sum_{i=0}^{n} a_i x^i \tag{5}$$

Figure 1:
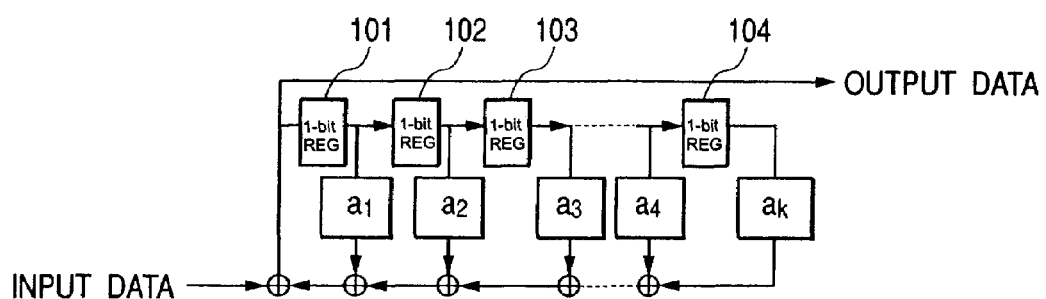
FIG. 1 is a block diagram showing a scrambling circuit according to the invention.
Figure 2:
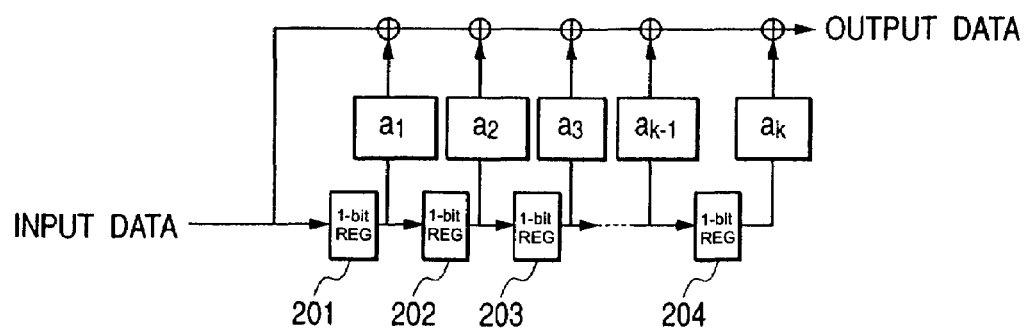
FIG. 2 is a block diagram showing a descrambling circuit according to the invention.

, the scrambling circuit can be implemented in FIG. 1, and the descrambling circuit can be implemented in FIG. 2. In the expression, $a_i$ is 1 or 0, and in the case of 1, a signal line is connected, and in the case of 0, a signal line is not connected.

Though the scrambling circuit 309 and the descrambling circuit 310 are respectively provided between a set of the error correction encoding circuit 307 and decoding circuit 308 and the host I/F 311 in the embodiment, they may be provided between a set of the run length limited encoding circuit 305 and decoding circuit 306 and a set of the error correction encoding circuit 307 and decoding circuit 308. Further, though the M-sequence generators 401, 701 are disposed on the host I/F 311 side from the guided scrambling circuit 403 and the descrambling circuit 703, respectively, in the embodiment, the M-sequence generators 401, 701 may be arranged on the optical disk 301 side from the guided scrambling circuit 403 and the descrambling circuit 703, respectively.

Figure 14:
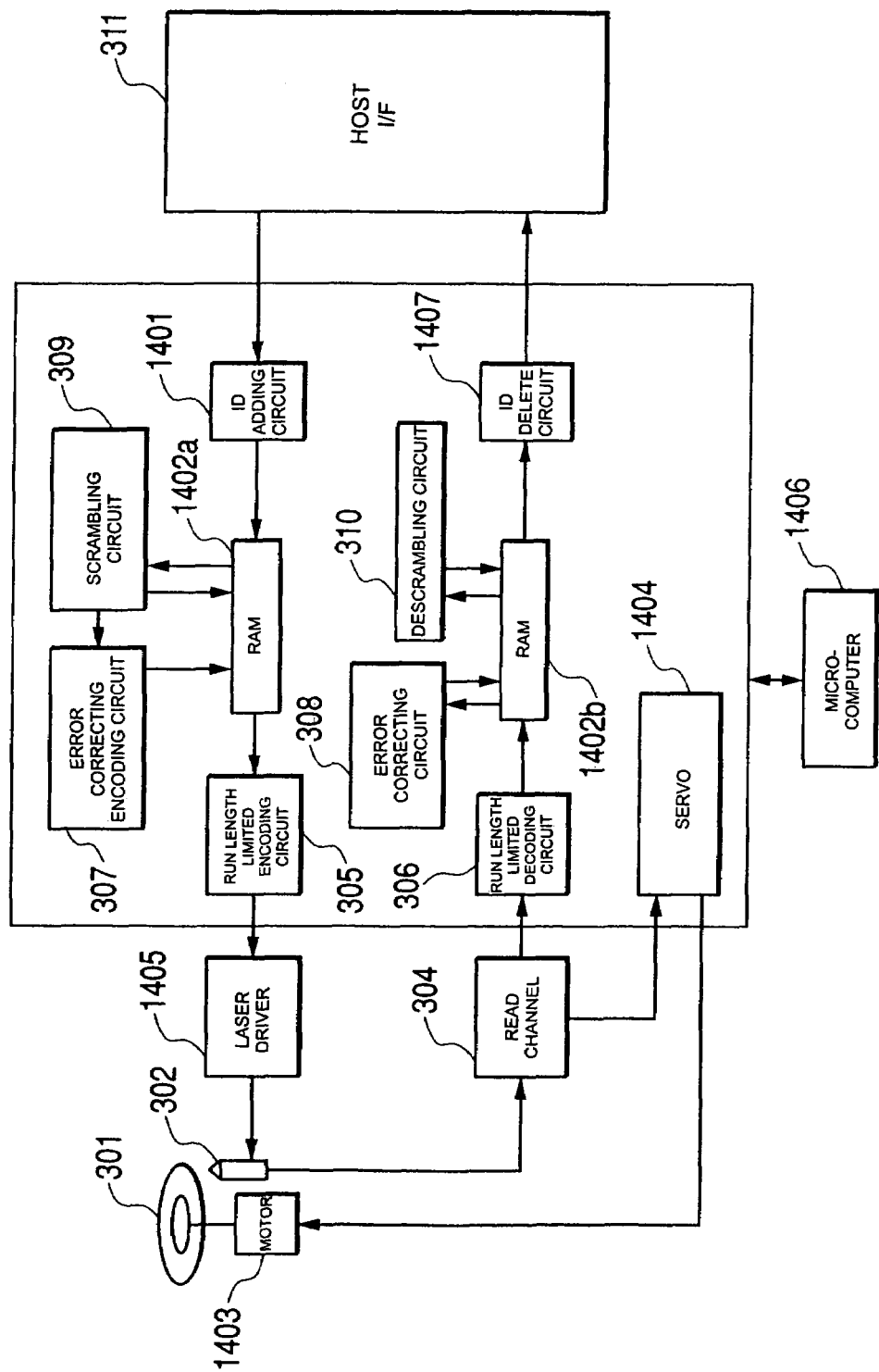
FIG. 14 is a system block diagram in the second embodiment of the invention.

FIG. 14 is a block diagram of a second embodiment of an optical disk apparatus to which the invention is applied. The present embodiment is the mode for carrying out the invention in the case of applying the guided scrambler described in the first embodiment to a DVD apparatus.

The reference numeral 311 designates an interface for conducting the data input and output control to a host device. The reference numeral 1406 is a microcomputer for supervising the system. The reference numeral 1401 is an ID adding device for adding additional information required for recording ID or the like to the user data given by the interface 311. The reference numerals 1402a and 1402b are memories (RAM) for temporarily storing data. The reference numeral 309 is a scrambler for randomizing data. The scrambler 309 is the same as described in the first embodiment and includes a fixed seed M-sequence generator and a guided scrambler. The reference numeral 307 is an error correcting encoding circuit for adding an error correcting code to the scrambled user data. The reference numeral 305 is an encoder for converting the user data to which an error correcting code is added to a run length limited code suitable to be recorded in the optical disk 301. The reference numeral 302 is a pickup for recording and reproducing data to and from the optical disk 301. The reference numeral 1403 is a spindle motor for rotating the disk. The reference numeral 1404 is a servo for conducting the control for an optical pickup 302 or the like.

The reference numeral 304 is a read channel for conducting waveform equalization processing and binarization for an analog signal read from the optical disk 301, and synchronous clock generation. The reference numeral 306 is a decoder for decoding a read run length limited code. The reference numeral 308 is an error detection correcting circuit for detecting an error according to an error correcting code added by the error correction encoding circuit 307 and correcting the error. The reference numeral 310 is a descrambling circuit described also in the first embodiment for releasing randomizing performed by the scrambler 309 to restore to the original user data. The descrambling circuit 310 includes a fixed seed M-sequence generator and a guided descrambler. The reference numeral 1407 is an ID delete device for deleting additional information required for recording ID or the like added by the ID adder 1401 to be only the user data.

A write format for the user data will now be described according to FIGS. 10 to 13.

To 2048-byte user data, for example, input from the interface 311, 11-byte data identification address information such as ID or the like (ID part 1001, IED part 1002, a reserve part 1003) and 4-byte error detection code (EDC: Error Detection code) 1006 are added by the ID adding device 1401.

Figure 12:
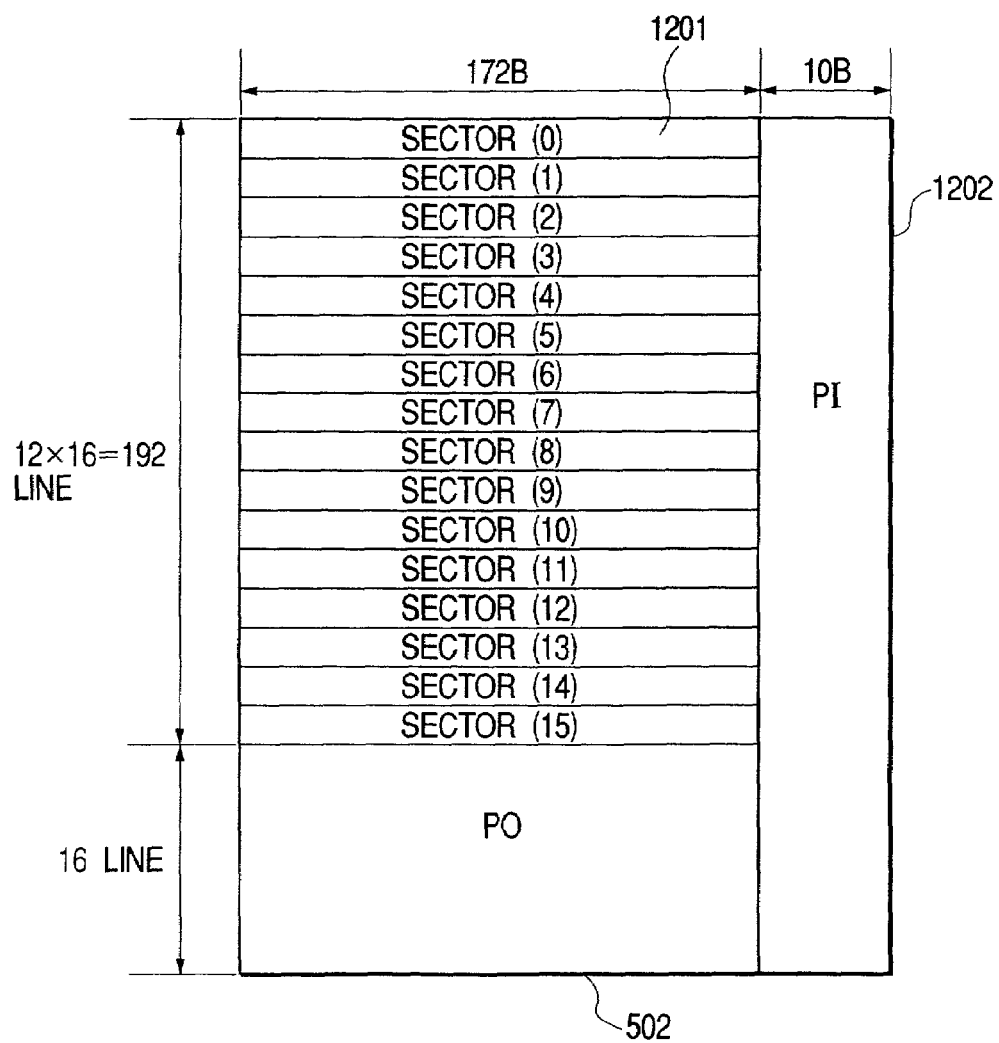
FIG. 12 is a diagram showing a recording format in the second embodiment of the invention.

The data to which information such as ID or the like is added is scrambled by adding one-byte guided scrambling seed 1004. Only the main data (user data) 1005 and the error detection code 1006 are to be scrambled, and the identification address information such as ID or the like is not scrambled. Eleven bytes of ID or the like, one byte of scrambling seed, 2048 bytes of user data, and four bytes of EDC are added to amount to 2064 bytes. The 2064 bytes of data is formed by 172 bytes ×12 lines. This is called "data sector". Subsequently, as shown in FIG. 12, sixteen "data sectors" are collected to be taken as one ECC block, and a cross read Solomon error correcting code is encoded. The longitudinal redundant byte is called PO, and the lateral redundant byte is called PI.

Figure 10:
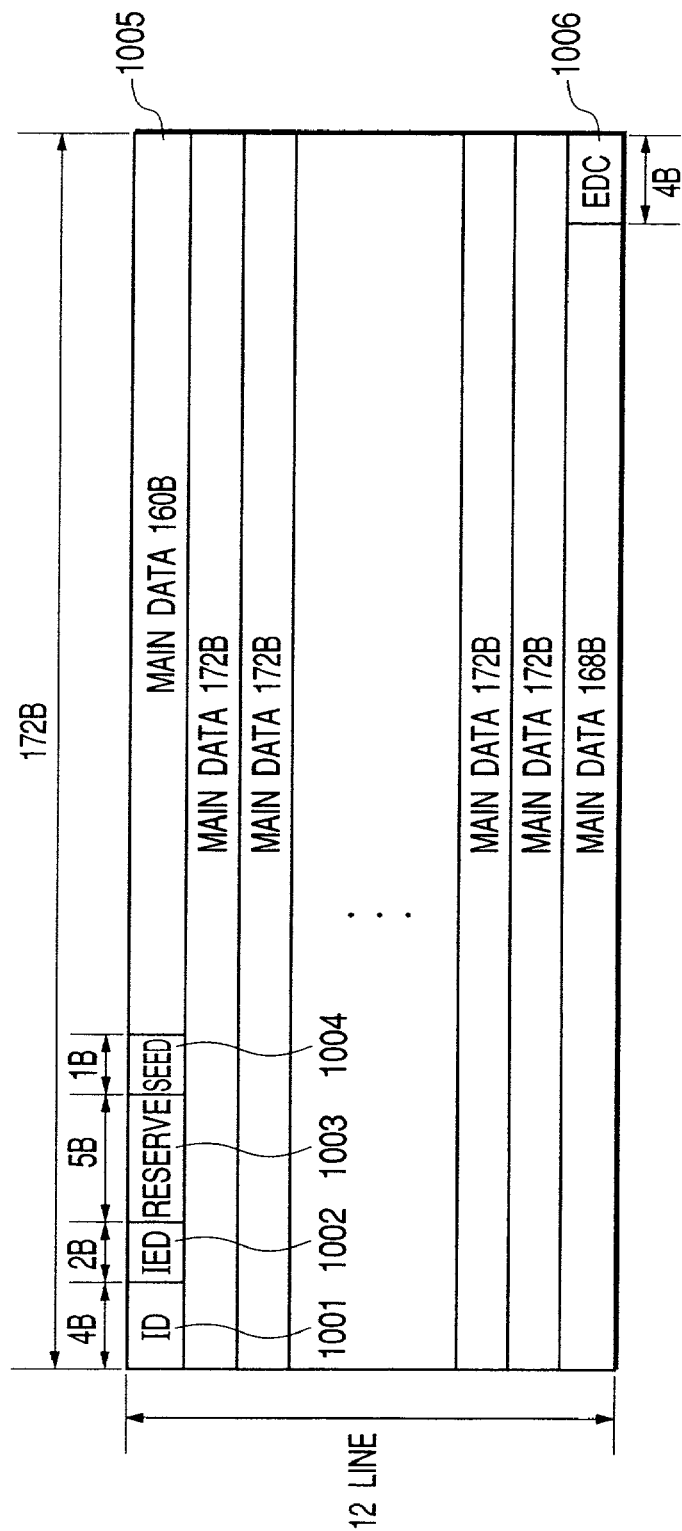
FIG. 10 is a diagram showing a data sector format.
Figure 11:
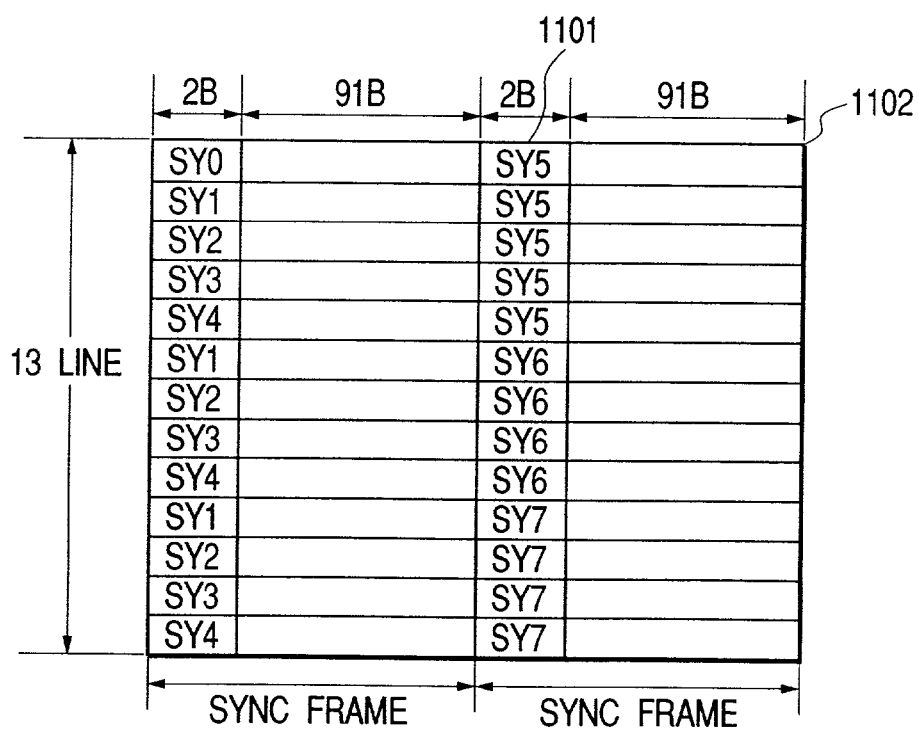
FIG. 11 is a diagram showing a physical sector format in the second embodiment of the invention.
Figure 13:
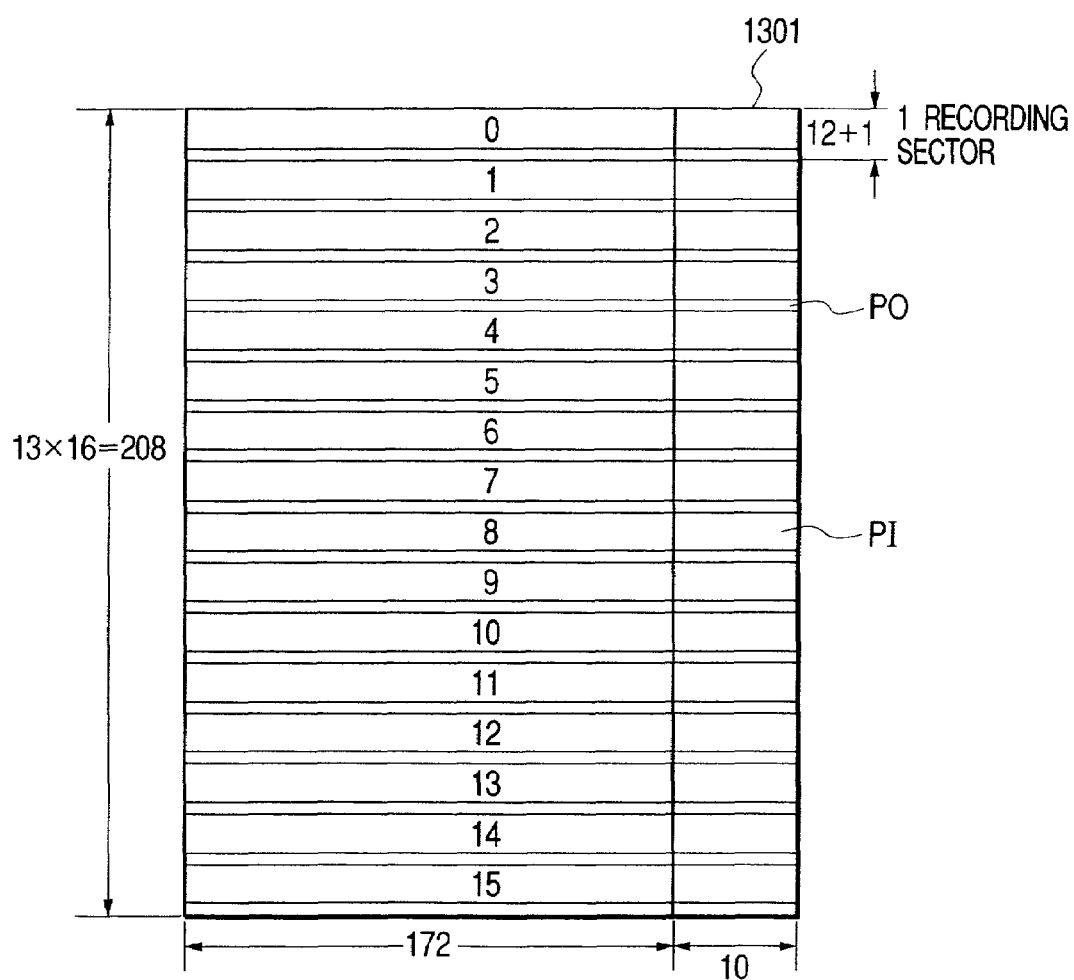
FIG. 13 is a conceptual drawing showing a PO interleave.

As shown in FIG. 13, sixteen lines of POs are allocated line by line to sixteen sectors to be rearranged to 172 bytes×(12+1) line. This is called PO interleaving, and the data of 172 bytes×(12+1) line is called "recording sector". A "physical sector" shown in FIG. 11 is a sector obtained by adding a synchronous signal (SYNC code) 1101 to the beginning of every 91 bytes of the "recording sector" 1102, and performing modulation by 8/16 conversion. EDC 1006 shown in FIG. 10 is a check code attached to the data sector 2060 bytes before scrambling. By the EDC code 1006, it is checked whether wrong correction is made or not.

Figure 28:
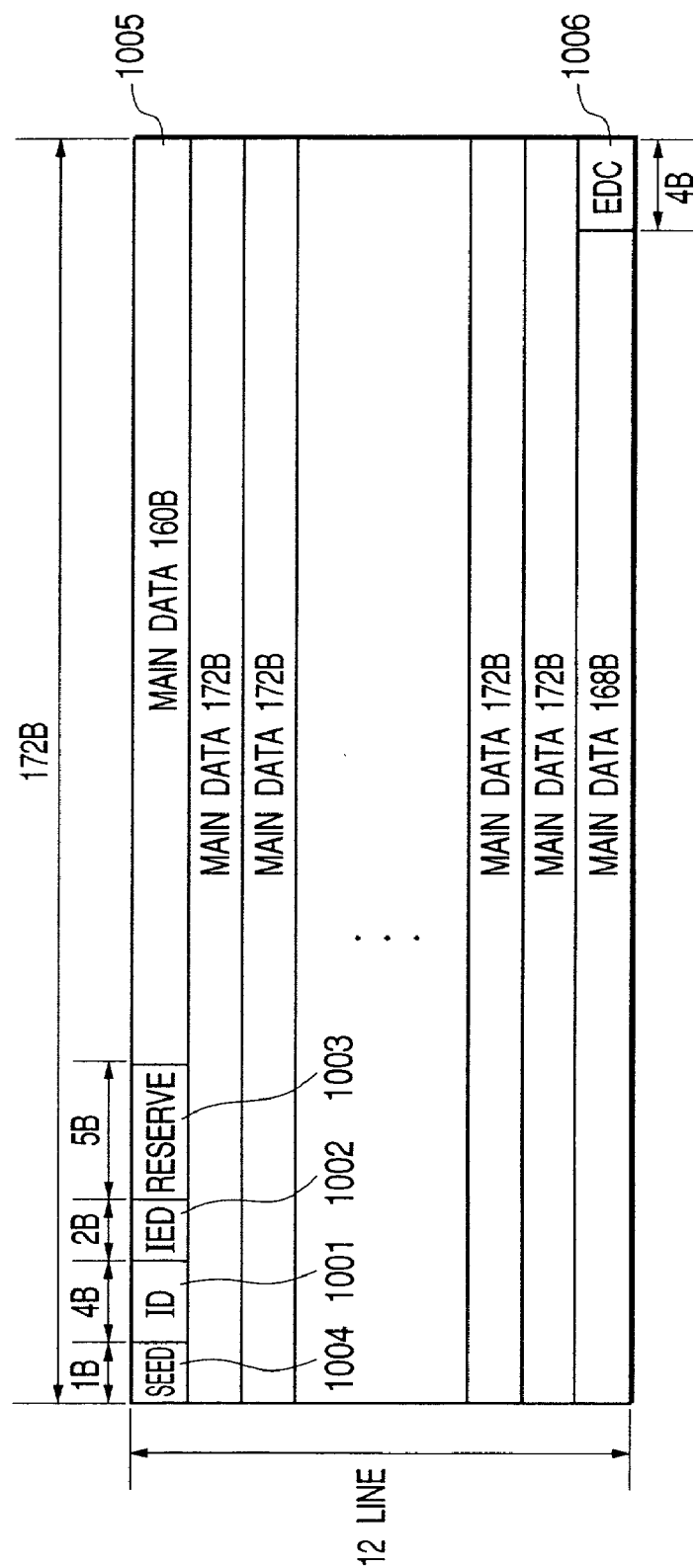
FIG. 28 is a diagram showing a another data sector format in the second embodiment of the invention.
Figure 29:
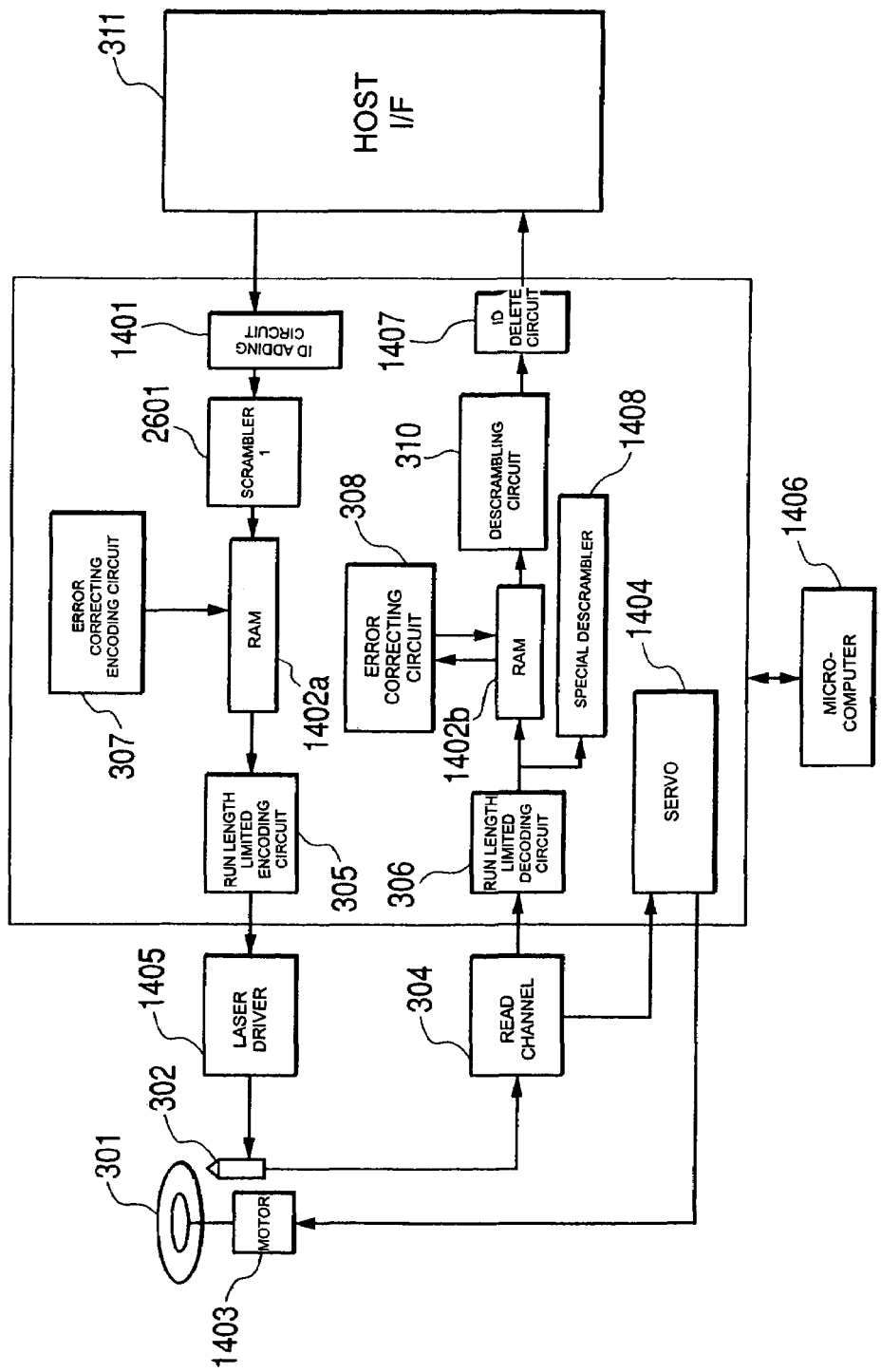
FIG. 29 is a another system block diagram in the second embodiment of the invention.

In a user's write format, as shown in FIG. 28, a seed may be added to the beginning. In this case, data identification address information 11 bytes (1001, 1002, 1003) such as ID, ID of a reserve or the like and detecting code (EDC: Error Detection Code) 4 bytes are scrambled similarly to the data. In the case of this format, deterioration of a medium of the ID part can be prevented. In the case of adopting the format shown in FIG. 28, it is necessary to place a special descrambler 1408 special for the ID part immediately after signal reproducing processing of PRML and read ID before decoding the ECC as shown in FIG. 29.

The operation in the DVD apparatus shown in FIG. 14 will be described.

Figure 15:
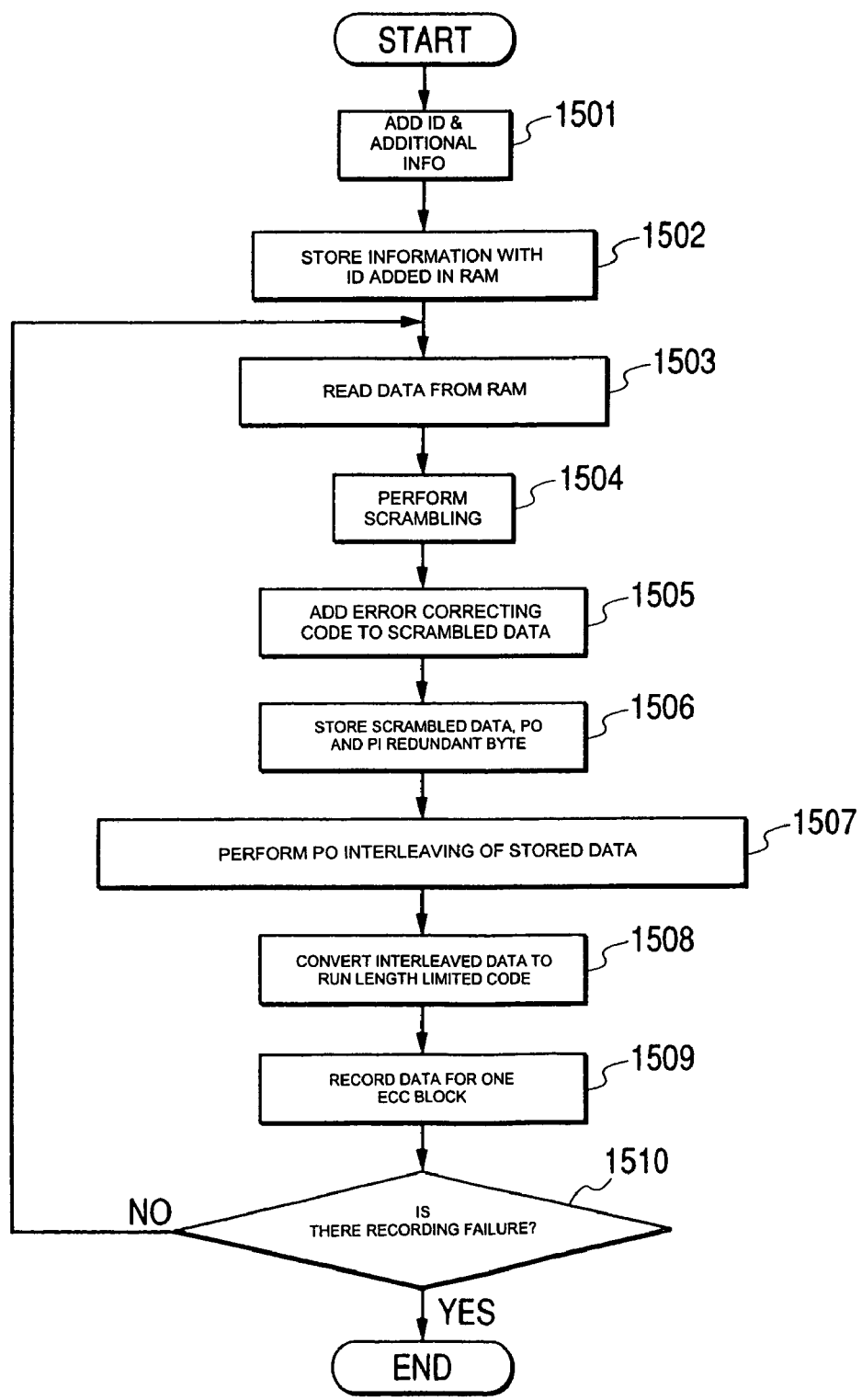
FIG. 15 is a processing flowchart of recording in the second embodiment of the invention.

FIG. 15 is a flowchart showing the procedure at the time of recording.

The ID adding circuit 1401 adds ID and additional information to data input from the interface 311 (Step 1501). The information to which ID or the like is added is temporarily stored in the RAM 1402a (Step 1502). The scrambling circuit 309 reads data from the RAM 1402a (Step 1503) and conducts scrambling processing (Step 1504. The error correction encoding circuit 307 adds an error correcting code to the scrambled data (Step 1505, and stores the same together with the scrambled data, PO redundant byte and PI redundant byte in the RAM 1402a (Step 1506. The stored data is subjected to PO interleaving (Step 1507. The encoding circuit 305 converts the data subjected to PO interleaving to a run length limited code (Step 1508. The data converted to the run length limited code is recorded on the optical disk 301 through a laser driver 1405 by the optical pickup 302.

When normally the data for one ECC block is recorded on the optical disk 301, the processing is ended. When a recording failure is caused in the midway by some reason, writing of the same data on the same place will deteriorate a medium. In this case, a seed is changed, and re-scrambling is performed to try again. In the flowchart of FIG. 15, the processing of the step 1503 and its followings are again conducted.

Figure 16:
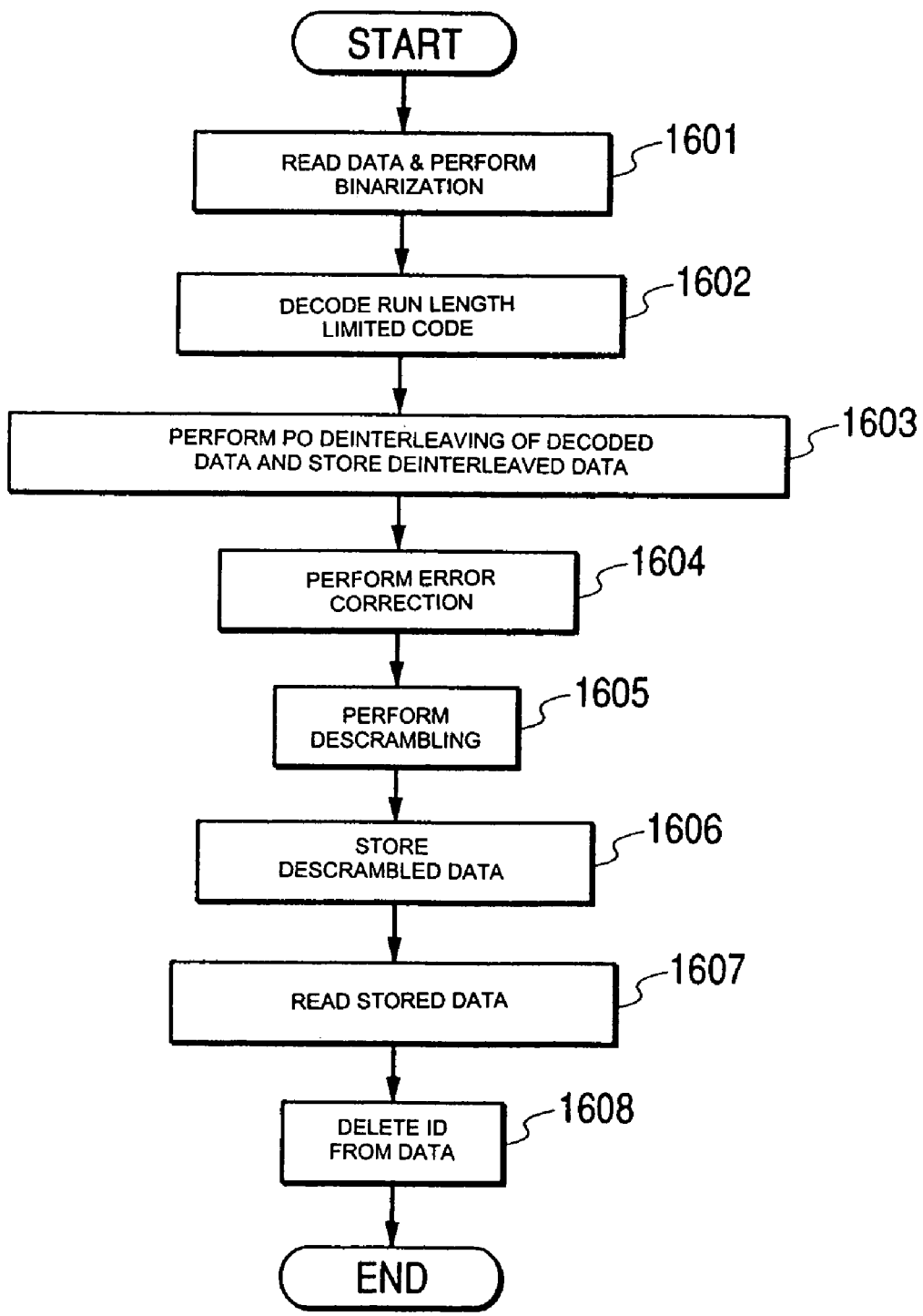
FIG. 16 is a processing flowchart of reproduction in the second embodiment of the invention.
Figure 17:
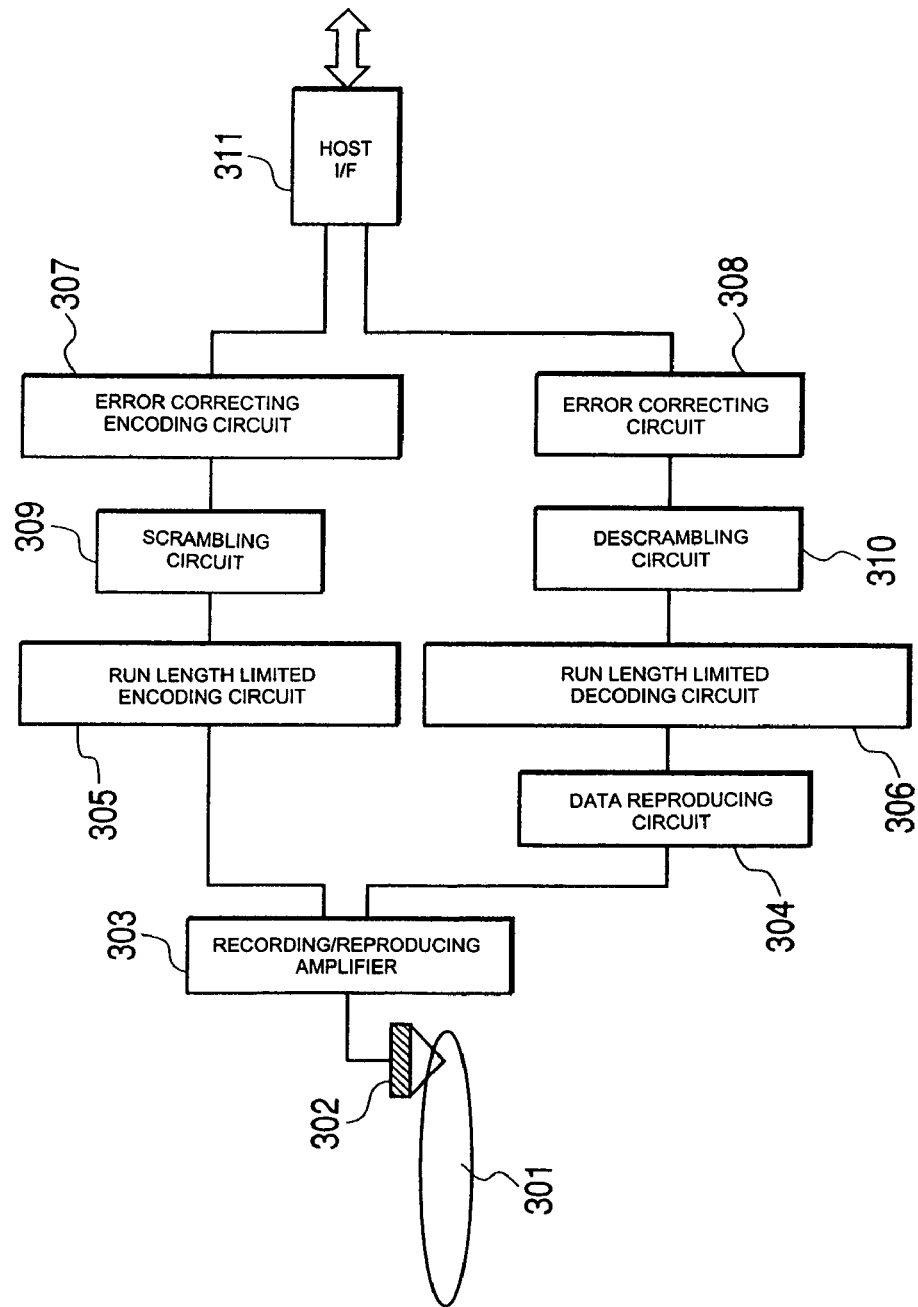
FIG. 17 is a schematic block diagram of an optical disk apparatus according to a third embodiment of the invention.

FIG. 16 is a flowchart showing the procedure at the time of reproducing.

At the time of reproducing, the optical pickup 302 reads data from the medium, and the read channel 304 performs binarization and synchronous clock generation (Step 1601. The decoding circuit 306 decodes a run length limited code (Step 1602, and while PO deinterleaving reverse to PO interleaving is performed, the data is temporarily stored in the RAM 1402b (Step 1603. Error correction (Step 1604 and descrambling (Step 1605 are conducted through the RAM 1402b, and the descrambled data is again stored in the RAM 1402b (Step 1606. Further, in the step 1606, the data stored in the RAM 1402 is read (Step 1607, and by the EDC code 1006, it is checked whether wrong correction is made or not. After that, additional information such as ID or the like and a seed are deleted from the data, which is output to the interface 311 (Step 1608).

According to the present embodiment, scrambling is released after the error correction processing is ended similarly to the first embodiment, so that the error correction capability is not deteriorated by error propagation of guided scrambling. Furthermore, as the present embodiment has configuration close to that of the current DVD apparatus, the apparatus can be easily developed.

Though a seed is added to every 2K byte of one sector user data in the first embodiment, guided scrambling may be performed with one seed in one ECC block to hold down a storage area of the seed. To be concrete, there are a method of consecutively processing one ECC block by one guided scrambling process and a method of processing the respective sectors of one ECC block with the same seed by the guided scrambling process. Further, since guided scrambling causes error propagation, it being taken into account that when error correction is disabled, data is relieved even in a small amount, it is desirable that as shown in the embodiment, scrambling is performed along the byte list of an error correcting code word in the case of conducting scrambling processing closer to the user side than the error correction encoding processing. Thus, when a large burst error occurs to disable error correction, scrambling can be released to the extent that one byte error propagation is caused from the final bit of the burst error.

Figure 18:
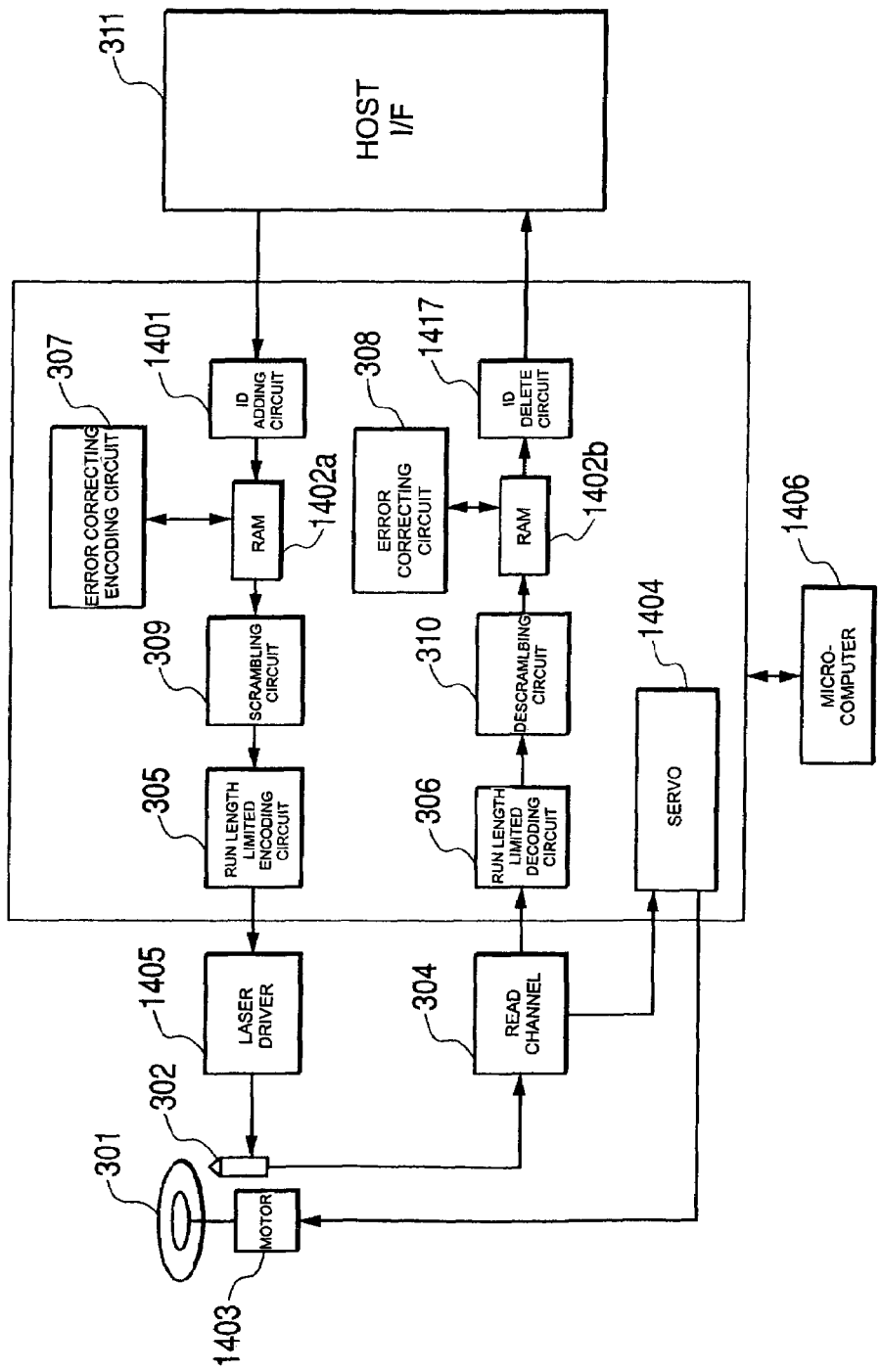
FIG. 18 is a block diagram of an optical disk apparatus according to the third embodiment of the invention.

FIG. 18 is a block diagram showing a third embodiment of an optical disk apparatus to which the invention is applied. The present embodiment has the same configuration as that of the optical disk apparatus in the second embodiment, but the differences from the second embodiment are the arrangement of the scrambling circuit 309 and the descrambling circuit 310, and the procedure of error correction encoding 307 and scrambling processing 309.

Figure 19:
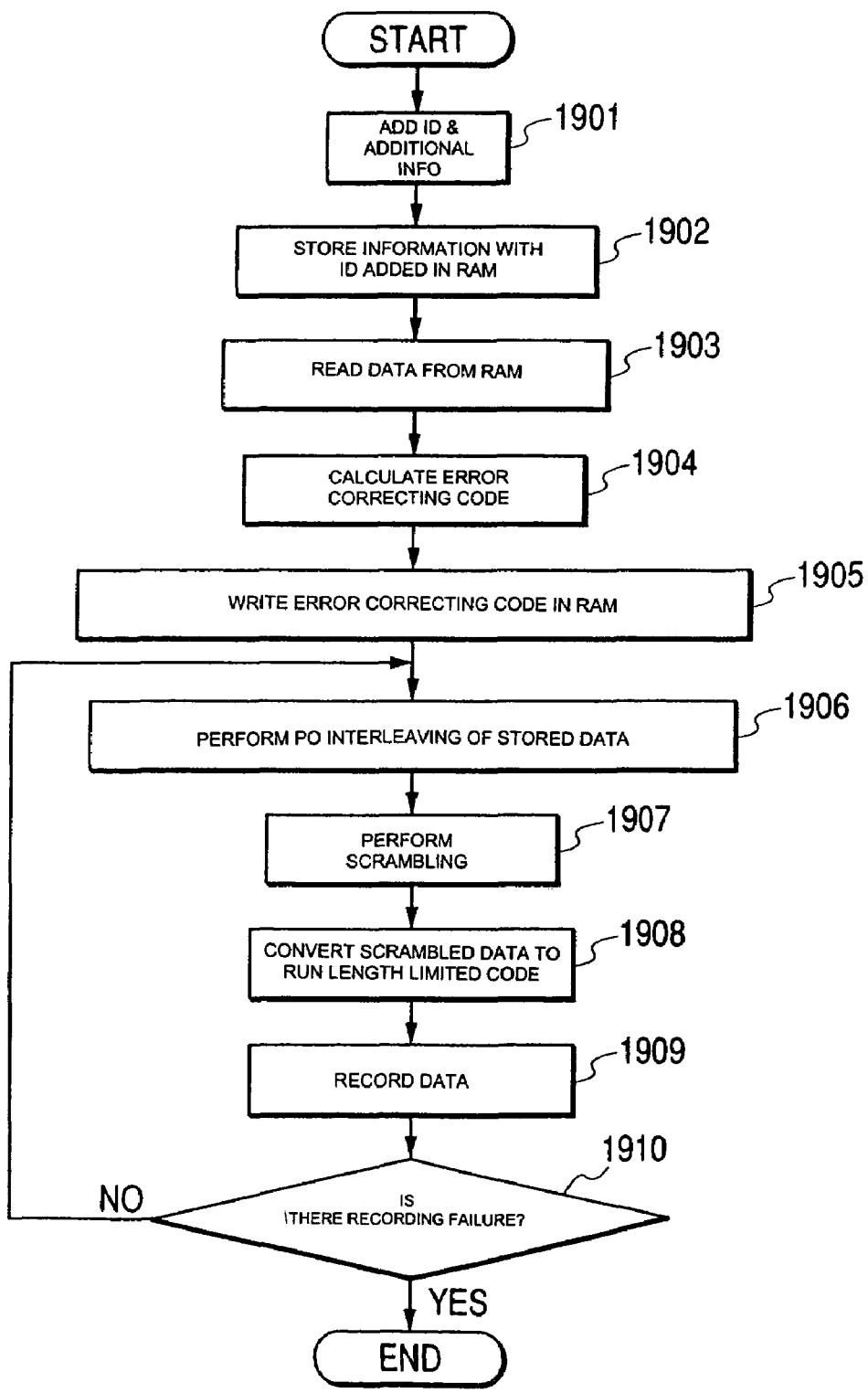
FIG. 19 is a processing flowchart of recording in the third embodiment of the invention.

FIG. 19 is a flowchart showing the procedure at the time of recording.

The ID adding circuit 1401 adds ID and additional information to data input from the interface 311 (Step 1901. The data to which ID or the like is added is temporarily stored in the RAM 1402a (Step 1902. The error correction encoding circuit 307 reads data from the RAM 1402a (Step 1903, calculates an error correcting code (Step 1904, and writes an error correcting code portion in the RAM 1402a (Step 1905.

While data is read from the RAM 1402a, PO interleaving is performed (Step 1906, and scrambling processing is conducted for the data read from the RAM 1402a (Step 1907. After that, encoding circuit 305 converts the scrambled data to a run length limited code (Step 1908. The data converted to the run length limited code is recorded on the optical disk 301 through the laser driver 405 under the control of the optical pickup 302.

When normally the data for one ECC block is recorded on the optical disk 301, it comes to end. In the case where a recording failure is caused in the midway by some reason, writing of the same data in the same place will deteriorate the medium. Therefore, the seed is changed to perform re-scrambling, and the processing is again conducted. In the flowchart of FIG. 19, the processing of the step 1906 and its followings are again conducted.

In the case of redoing writing in the present embodiment, it is not necessary to again calculate an error correcting code, so that load at the time of rewriting can be lowered. Furthermore, as it is not necessary to save the scrambled data in the RAM, the frequency of access to the RAM is reduced so that high speed processing is attained.

Figure 20:
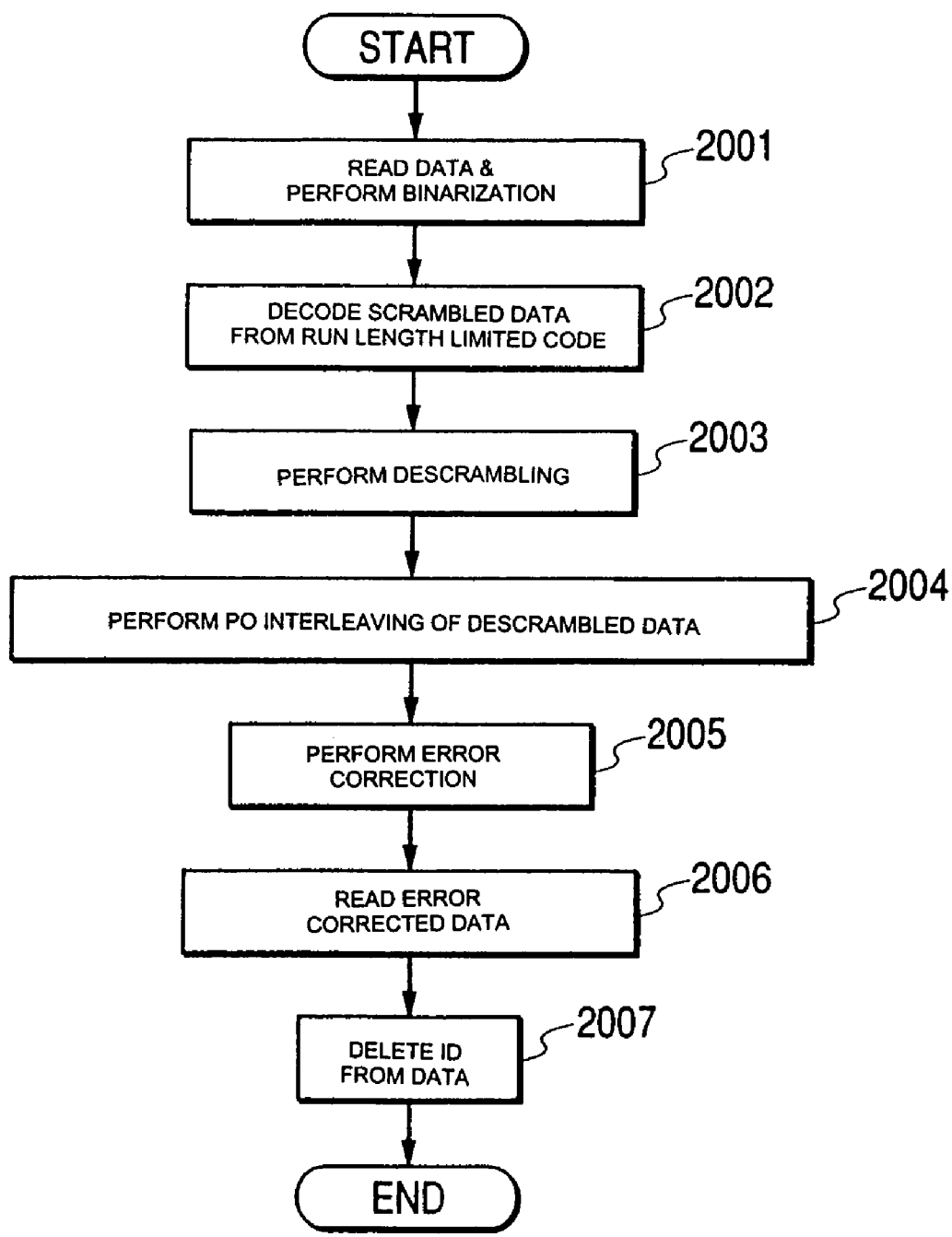
FIG. 20 is a processing flowchart of reproduction in the third embodiment of the invention.

FIG. 20 is a flowchart showing the procedure of reproducing.

The optical pickup 302 reads data from the recording medium, and the read channel 304 performs binarization and synchronous clock generation (Step 2001. The decoding circuit 306 decodes scrambled data from a run length limited code (Step 2002. The descrambling circuit 310 conducts descrambling processing (Step 2003. The descrambled data is subjected to PO deinterleaving reverse to PO interleaving, and temporarily stored in the RAM 1402b (Step 2004. Error correction is made for the data stored in the RAM 1402b (Step 2005. The error corrected data is read from the RAM 1402*b* (Step 2006, and by the EDC code 1006, it is checked whether wrong correction is made or not. The checked data, from which additional information such as ID or the like and a seed have been deleted, is output from the interface 311 (Step 2007.

In the case of conducting error correction processing after scrambling is released, random 1 byte error becomes 2 byte error due to error propagation of guided scrambler so that the number of errors is increased. Accordingly, the number of errors to be corrected is decreased under the same error correcting capability of the error correcting code. Further, since the guided scrambler causes error propagation, it being taken into account that when error correction is disabled, data is saved even in a small amount, it is desirable that as shown in the present embodiment, scrambling is performed along the written byte list in the case of conducting scrambling processing at the optical disk medium side. According to the present embodiment, when a large burst error occurs to disable error correction, scrambling can be released only with one byte error propagation from the final bit of the burst error.

Figure 25:
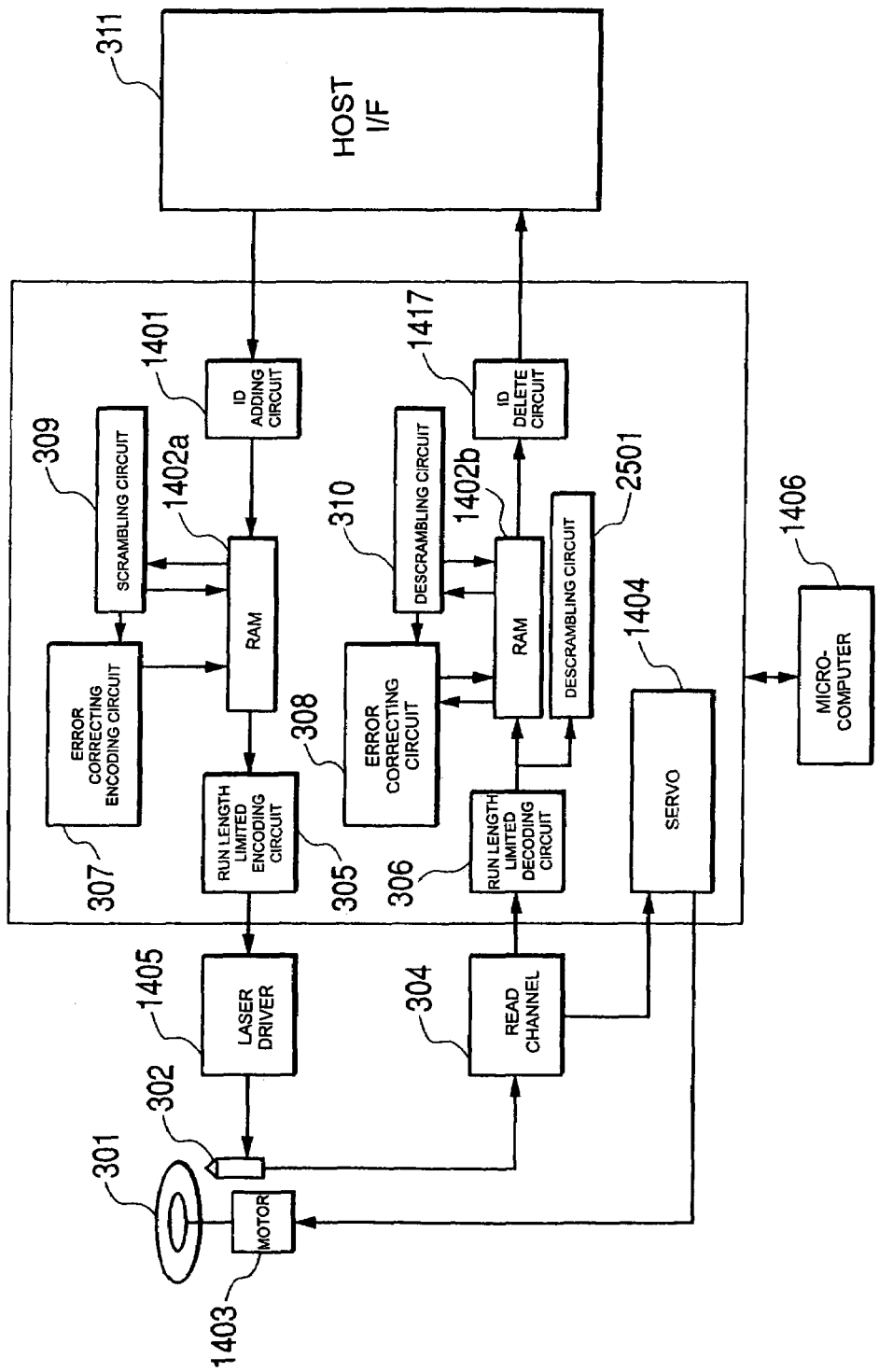
FIG. 25 is a block diagram of an optical disk apparatus according to the fourth embodiment of the invention.

FIG. 25 is a block diagram showing a fourth embodiment of an optical disk apparatus to which the invention is applied.

Figure 21:
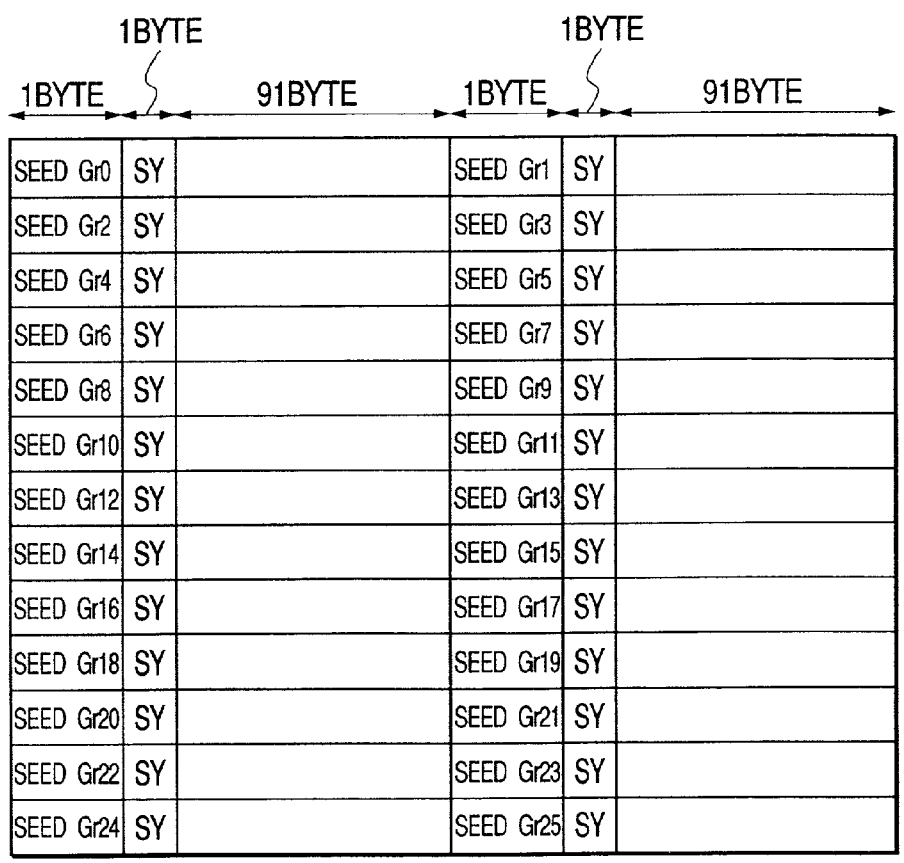
FIG. 21 is a diagram showing a physical format in a fourth embodiment of the invention.
Figures 22, 23:
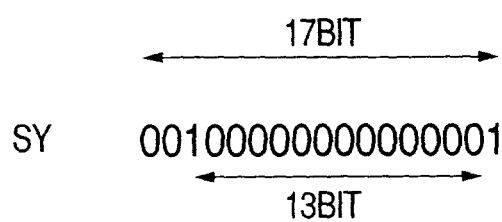
FIG. 22 is a diagram showing grouping of seeds in the fourth embodiment of the invention.
FIG. 23 is a diagram showing a fixed SYNC pattern in the fourth embodiment of the invention.

In the present embodiment, data is written on the optical disk in the physical format shown in FIG. 21. In the present embodiment, as a run length limited code, EFM plus used in the DVD is used. EFMPlus is (d, k)=(2,10) code, the minimum mark and space length is 3 channel bit, and the maximum mark and space length is 11 channel bit. In FIG. 21, a SYNC pattern indicated by "SY" is a bit string shown in FIG. 23. The bit string in FIG. 23 is expressed by NRZI form. "1" means that the mark and the space are reversed, and "0" means that they are kept intact. As the SYNC pattern is clearly distinguished from the data, the SYNC pattern contains mark or space for 14 channel bit which does not exist in the data part. One kind of a SYNC pattern is written following one scrambling seed. 256 scramble seeds are, as shown in FIG. 22, classified in 26 ways, and the seed appearing in one position on each physical format is limited to one way. For example, the seed in the first position of the physical sector is seedGr0, that is, selected from nine from the seed 0 to the seed 8.

The procedure of recording data will now be described.

Figure 24:
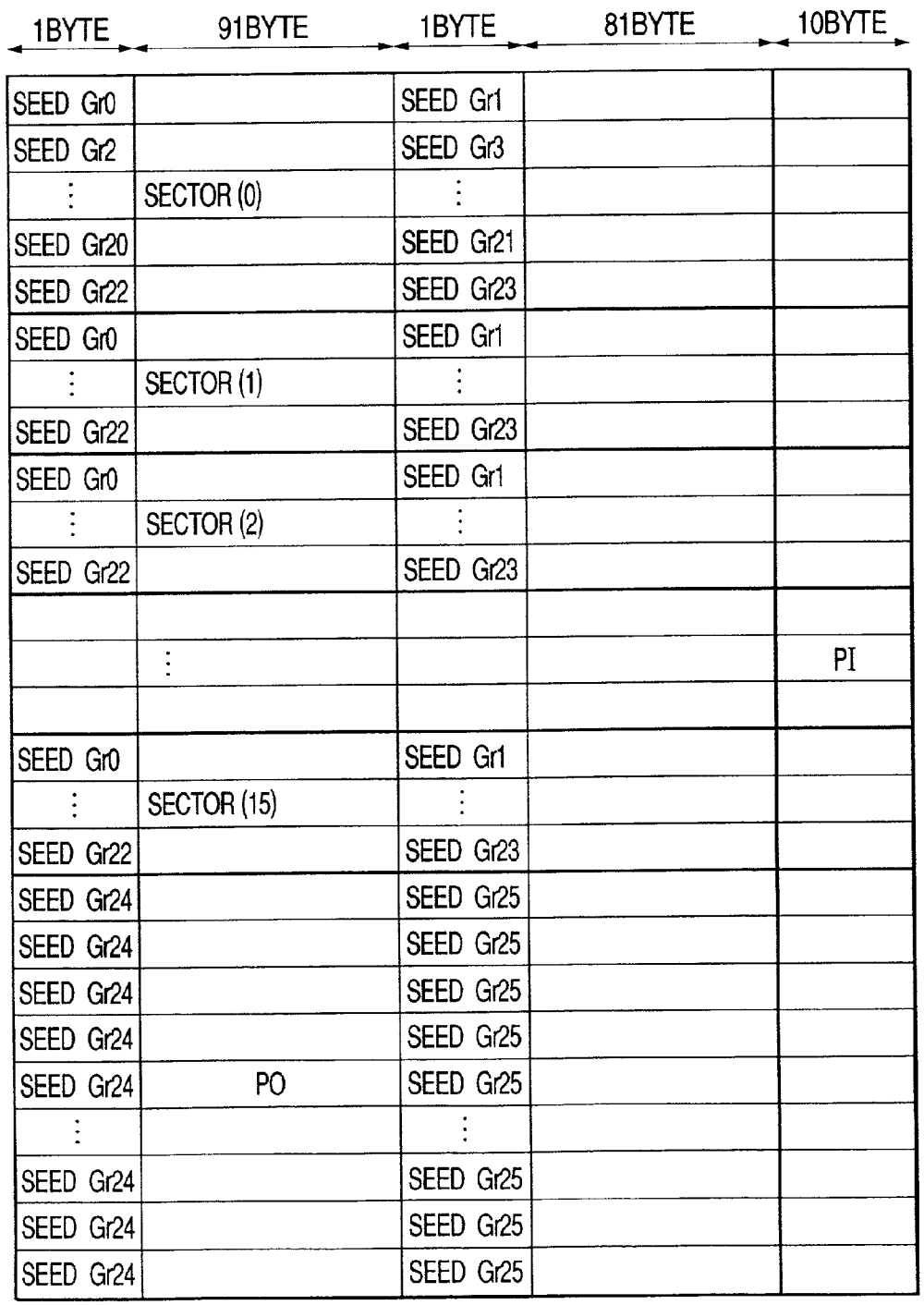
FIG. 24 is a diagram showing a recording format in the fourth embodiment of the invention.

The ID adding circuit 1401 adds ID and additional information to data input from the interface 311 to form a data sector. The data sector is temporarily stored in the RAM 1402*a*. The data is read from the RAM 1402*a*, and the lateral 172-byte data sector is divided into 91 bytes and 81 bytes. The divided data are respectively scrambled by one seed selected from the seeds contained in the classification shown in FIG. 24. The scrambled data is, as shown in FIG. 24, written back to the RAM 1402*a*.

The error correcting encoding circuit 307 calculates error correcting codes PO, PI for the data written back to the RAM 1402*a*. The data subjected to error correcting code calculation is written in the RAM 1402*a* according to the format of FIG. 24. After that, while data is read from the RAM 1402*a*, PO interleaving is performed. The encoding circuit 305 converts the data subjected to PO interleaving to a run length limited code, and a SYNC pattern of a fixed pattern is, as shown in FIG. 21, inserted therein to form a physical sector. The thus processed data is recorded on the optical disk 301 through the laser driver 1405 by the optical pickup 302.

At the time of reproducing, the optical pickup 302 reads the data recorded on the medium. The read channel 304 performs binarization and synchronous clock generation for the read data. The decoding circuit 306 decodes the scrambled data from the run length limited code.

The descrambling circuit 2501 conducts descrambling processing for the decoded data, and searches for a SYNC pattern of a fixed pattern. When the SYNC pattern is found, the descrambling circuit 2501 checks the descrambled seed data immediately before the SYNC pattern, and stores the data read on the basis of grouping of the read seed data in the RAM 1402*b* according to the recording format shown in FIG. 21. The data stored in the RAM 1402*b* is subjected to error correction and descrambled. After that, by the EDC code 1006, it is checked whether scrambling is correct or not, and after error correction is made, wrong correction is made or not. Additional information such as ID or the like and the seed are deleted to output data to the interface 311.

The processing is thus conducted, whereby scrambling is performed in units of 91 bytes of the user data, so that error propagation due to scrambling is kept from being propagated outside the 91 bytes. Furthermore, it is uniquely known to which position of the recording sector the read data corresponds. Further, the additional bit required for the SYNC pattern and the scrambling seed is 26 bits per one sector as compared with the conventional DVD, addition of about 1.6 byte per one sector will be sufficient.

Further, according to the present embodiment, it is sufficient to provide only a single SYNC pattern, and it is not necessary to provide plural SYNC patterns for knowing the position in the sector. Accordingly, design for the run length limited code can be very facilitated. In the optical disk, since low-frequency noise is much, a high-pass filter is used in reproduction. Consequently, distortion is easily caused immediately after a long mark and space. As the fixed SYNC pattern is needed to be clearly separated from another recorded code, generally a long mark and space not appearing in the recorded code are used in many cases. Accordingly, it is desirable to place the scramble seed in front of the fixed SYNC pattern.

Figure 26:
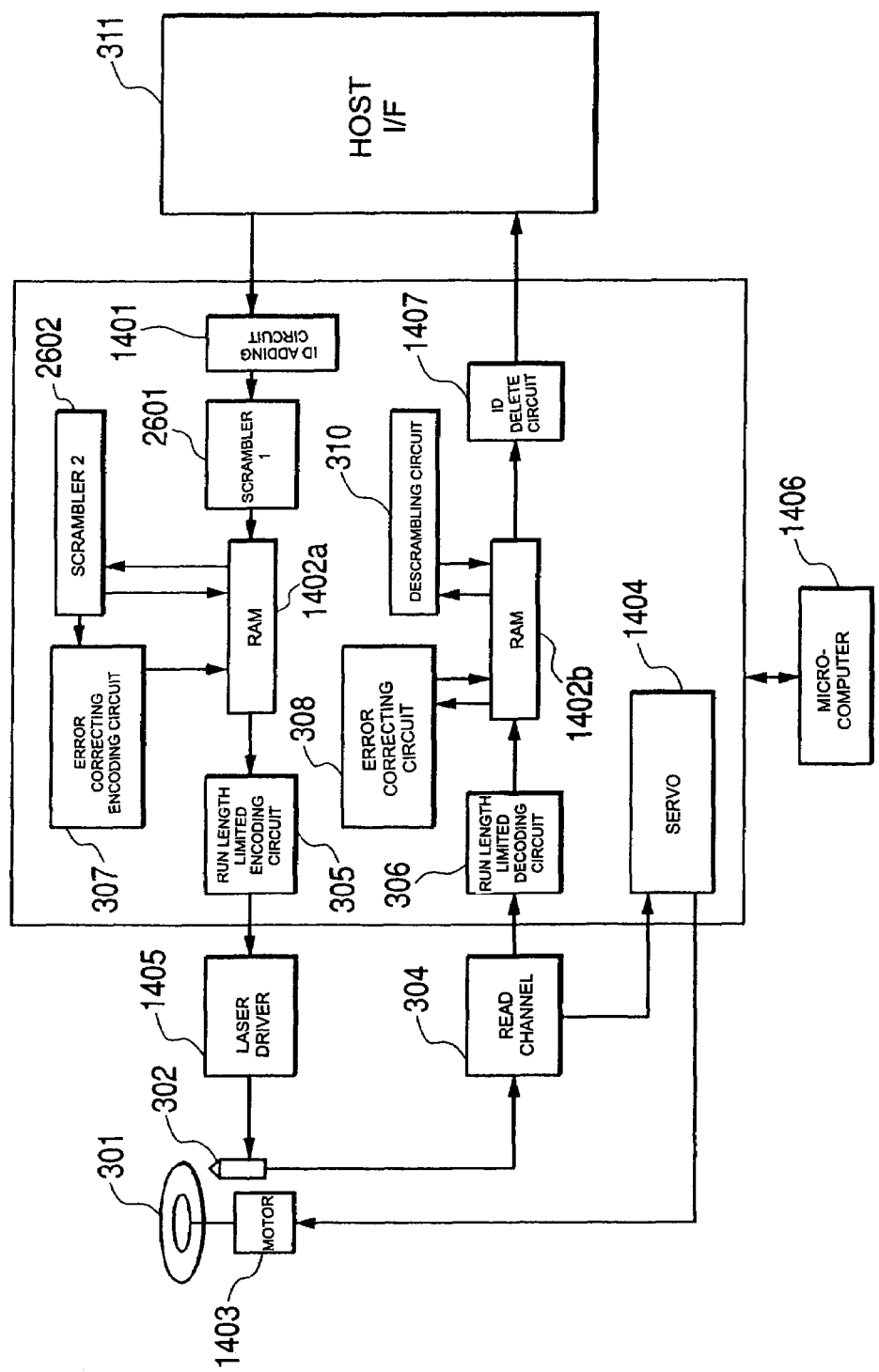
FIG. 26 is a system block diagram in the fifth embodiment of the invention.

A fifth embodiment will now be described with reference to FIGS. 26 and 27. The fifth embodiment is different from the second embodiment in that scrambling is performed before data is stored in RAM. As shown in FIG. 26, a scrambler 1 (2601 and a scrambler 2 (2602, that is, two scrambling circuits are provided, and the scrambler 1 is the scrambling circuit shown in the first embodiment. First, at the time of recording, the data input from the interface 311, to which ID and additional information are added in the ID adding circuit 1401, is scrambled by the scrambler 1 (2601, and then temporarily stored in the RAM 1402*a*. Subsequently, an error correcting code is calculated in the error correcting encoding circuit 307, and PO redundant byte and PI redundant byte are stored in the RAM. PO interleaving is performed while reading from the RAM, and the data is converted to a run length limited code in the encoding circuit 305, which is recorded on the optical disk 301 by controlling the optical pickup 302 through the laser driver 1405. When the data for one ECC block is normally recorded on the optical recording medium, it comes to an end. In the case where a recording failure is caused in the midway by some reason, however, when the same data is written in the same place, the medium is deteriorated, so the seed is changed to perform re-scrambling and try again. In that case, the data stored in the RAM is scrambled by the scrambler 2 (2602 and again stored in the RAM, an error correcting code is again added by the error correcting encoding circuit, then PO interleaving is performed, a run length limited encoding is performed, and re-writing is performed. The scrambler 2

Figure 27:
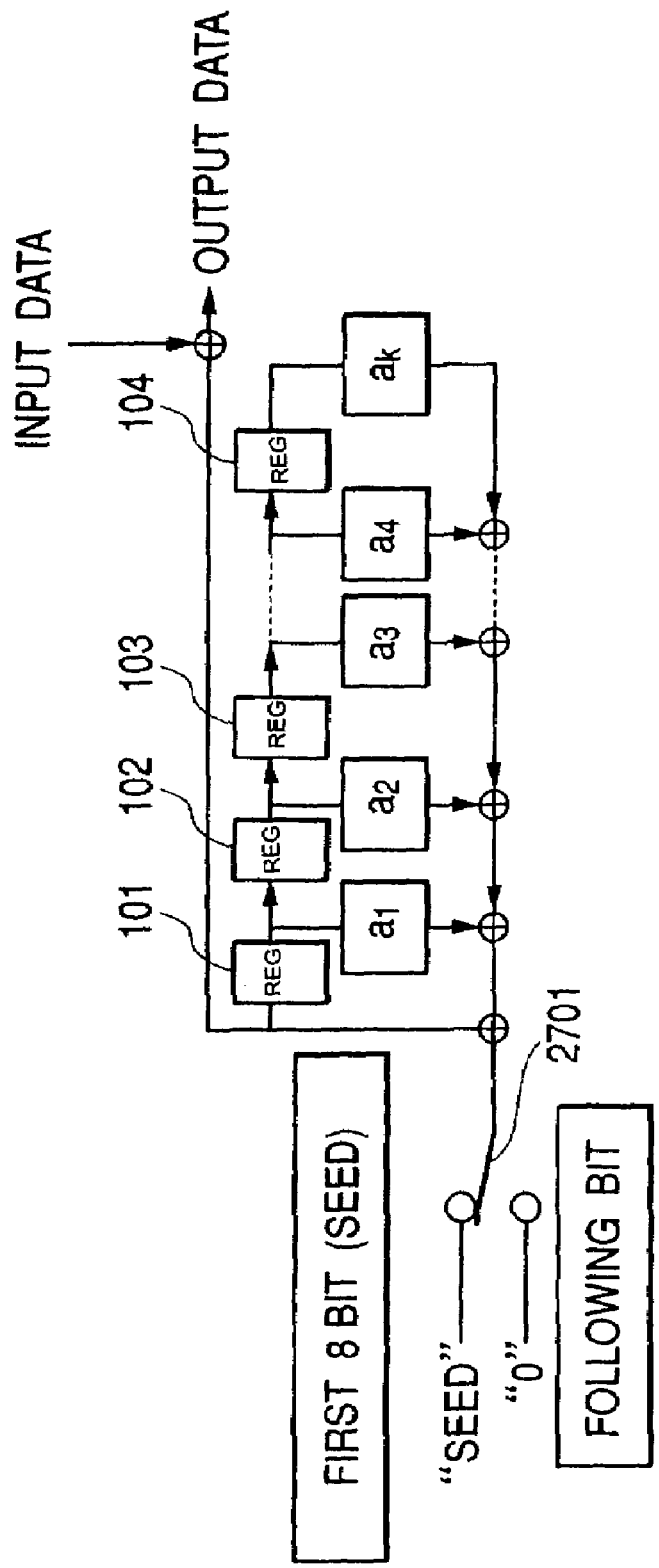
FIG. 27 is a block diagram showing a scramble circuit according to the fifth embodiment of the invention.

(2602 circuit is shown in FIG. 27. In this circuit, the switch 2701 is turned down toward the first 8-bit seed, and then controlled toward "0". From the seed direction, a suitable 8-bit seed bit string is input at every time. An exclusive OR of the M-sequence generated by this circuit and the scrambled data stored in the RAM is operated bit by bit to perform re-scrambling with different seeds. At the time of reproducing, reproduction may be performed similarly to the second embodiment.

According to the invention, an arbitrary seed data is added to the original data to be recorded on the disk to scramble the data, whereby plural ways of scramble can be conducted depending on the selection of seed data. Accordingly, even if a large amount of the same data is written on the adjacent track, the written data of the adjacent track can be prevented from being the same data. Further, even in the case where the same data is written in the physically same position, actually the written data are made different, so that the medium can be prevented from being deteriorated.

According to the invention, one-bit descramble data is determined by operation using plural-bit scramble data, whereby it is not necessary to know the seed data at the time of descrambling, so that descrambling can be performed by the simple same procedure.

Further, according to the invention, one-bit descramble data is determined by operation using n-bit scramble data. When the n-bit scramble data has an s-bit length, the error of descramble data is just extended by s-bit to the error of the scramble data, whereby it is possible to prevent the situation that the whole data can not be descrambled.

Further, according to the invention, guided scramble and scramble with a long-period fixed seed are used jointly, so that sufficient randomizing for the data can be secured.

Further, according to the invention, scramble is conducted before the generation of an error correcting code, and descramble is conducted after decoding of the error correcting code, whereby the decoding characteristic of the error correcting code can be prevented from being deteriorated by error propagation due to scramble.

What we claim:

1. A data-randomizing method for an optical disk apparatus adapted to record data on recording medium by light, and read data from the recording medium by utilizing a difference in reflectance, comprising:
    adding seed data for randomizing, to subject data to be recorded on the recording medium, and
    determining at least one bit randomized data by operating at least one bit data added seed data to the subject data and multiple bit randomized data which was made from at least one bit data added seed data and multiple randomized bit data,
    wherein a different value of seed data is used as the seed data for every time of rewriting data, and
    wherein the seed data is data which is produced by using a different value for every time of rewriting data to a same address location of the recording medium.

2. A decoding method for randomizing data used in an optical disk reading apparatus adapted to read randomized data by the method according to claim 1, comprising determining one-bit de-randomized data by an operation using multiple bit randomized data.

3. An optical disk recording medium for recording data by light, and enabling reading data recorded thereon by utilizing a difference in reflectance, in which data is randomized and written thereon by:
    adding seed data for randomizing data, to subject data to be recorded on the optical disk recording medium; and
    determining at least one-bit randomized data by operation using at least one-bit data to be added by seed data to the subject data and multiple-bit randomized data which was made from at least one bit data added seed data and multiple randomized bit data,
    wherein the seed data is data which is produced by using a different value for every time of rewriting data, and
    wherein the seed data is data which is produced by using a different value for every time of rewriting data to a same address location of the recording medium.

4. An optical disk apparatus using the data-randomizing method according to claim 1, wherein data recorded on the recording medium is data recorded by adding error corrected code after randomizing by the data-randomizing method.

5. An optical disk apparatus for reading data recorded by using the method data-randomizing according to claim 1, wherein the subject data which is added by error correction code to be read from the recording medium is de-randomized data after error correction.

6. A data-randomizing method for an optical disk apparatus adapted to record data on recording medium by light, and read the data on the recording medium by utilizing a difference in reflectance, adding randomized data based on seed data to user data by performing an exclusive OR operation of a first data randomizing method to produce first randomized data, which is randomized by a second data-randomizing method according to claim 1.

7. A data-randomizing method according to claim 1, wherein data is randomized in every fixed unit, and data of a fixed unit contains address identification information including at least ID, user data, and an error detection code.

8. A data-randomizing method according to claim 1, wherein data is randomized in every fixed unit, and data of a fixed unit contains seed data, address identification information including at least ID, user data, and an error detection code.

9. A data-randomizing method according to claim 1, wherein data is randomized in every fixed unit for recording, and seed data is placed in front of a synchronous signal.

10. An optical disk apparatus according to claim 4, wherein an order of data arrangement for data randomizing is similar to an order of an error correction code word for decoding.

11. An optical disk apparatus using the data-randomizing method according to claim 1, wherein subject data recorded on the recording medium is recorded by adding an error correction code, data-randomization is performed after the error correction coding, and an order of data arrangement for data randomizing is similar to an order of recording data on the recording medium.

12. A data-randomizing method for an optical disk apparatus adapted to record data on recording medium by light, and read data from the recording medium by utilizing a difference in reflectance, comprising:
    adding seed data for randomizing, to subject data to be recorded on the recording medium, and
    determining at least one bit randomized data by operating at least one bit data added seed data to the subject data and multiple bit randomized data,
    wherein a different value of seed data is used as the seed data for every time of rewriting data, and
    wherein the seed data is data which is produced by using a different value for every time of rewriting data to a same address location of the recording medium.

13. An optical disk recording medium for recording data by light, and reading data recorded on the optical disk recording medium by utilizing a difference in reflectance, in which data is randomized and written thereon by:
  adding seed data for randomizing data, to subject data to be recorded on the optical disk recording medium; and
  determining at least one-bit randomized data by operation using at least one-bit data to be added by seed data to the subject data and multiple-bit randomized data, wherein the seed data is data which is produced by using a different value for every time of rewriting data, and wherein the seed data is data which is produced by using a different value for every time of rewriting data to a same address location of the recording medium.

* * * * *